United States Patent [19]

Fukushima et al.

[11] Patent Number: 5,993,974
[45] Date of Patent: Nov. 30, 1999

[54] PORCELAIN-ENAMELED STEEL SHEETS AND FRITS FOR ENAMELING

[75] Inventors: Yasumasa Fukushima; Masato Kumagai; Kyoko Hamahara; Toshihide Suzuki; Koji Watanabe; Hiroshi Nagaishi; Fusao Togashi, all of Chiba, Japan

[73] Assignees: Kawasaki Steel Corporation, Hyogo, Japan; Kawasaki Steel Metal Products & Engineering Inc., Hyogo, Japan

[21] Appl. No.: 09/186,693

[22] Filed: Nov. 6, 1998

[30] Foreign Application Priority Data

| Nov. 11, 1997 | [JP] | Japan | 9-308537 |
| Nov. 27, 1997 | [JP] | Japan | 9-326144 |
| Dec. 26, 1997 | [JP] | Japan | 9-359333 |
| Dec. 26, 1997 | [JP] | Japan | 9-359966 |
| Dec. 27, 1997 | [JP] | Japan | 9-367891 |

[51] Int. Cl.$^6$ ............................................. B32B 15/00
[52] U.S. Cl. ........................... 428/433; 428/457; 428/469
[58] Field of Search ................................ 428/457, 469, 428/472, 472.1, 472.3, 472.2, 433, 701, 702; 501/24, 26

[56] References Cited

U.S. PATENT DOCUMENTS 4,056,657  11/1977  Leckie ..................................... 428/659

FOREIGN PATENT DOCUMENTS

| 0 565 346 | 10/1993 | European Pat. Off. . |
| 0 710 732 | 5/1996 | European Pat. Off. . |
| 60-169571 | 9/1985 | Japan . |
| 61-052321 | 3/1986 | Japan . |
| 1-141835 | 6/1989 | Japan . |
| 1-145347 | 6/1989 | Japan . |

*Primary Examiner*—Timothy Speer
*Attorney, Agent, or Firm*—Young & Thompson

[57] ABSTRACT

A porcelain enameled steel sheet comprises an aluminum/zinc alloy-plated steel sheet and a porcelain enamel coating layer as the upper most layer of the steel sheet, wherein an interstitial layer having good adhesion to the plating layer and the enamel coating layer is sandwiched between these two layers. The intermediate layer is preferably a member selected from the group consisting of: (1) the surface layer on the aluminum/zinc alloy-plating layer, whose aluminum content is not less than 96% by weight; (2) the surface layer on the aluminum-zinc alloy-plating layer, which comprises aluminum, nickel and not more than 1% by weight of zinc; (3) a coating layer comprising at least one member selected from the group consisting of Ni, Co, Mo, Mn, Ni—P, Ni—Co—P and Co—P; (4) a chromate layer; and (5) a coating layer comprising at least one member selected from the group consisting of zinc phosphate, manganese phosphate and aluminum phosphate. The porcelain enameled steel sheet is excellent in both corrosion resistance and enamel-adhesive properties and can thus be used in various fields, in particular, in the field wherein it is post-processed through bending.

15 Claims, 1 Drawing Sheet

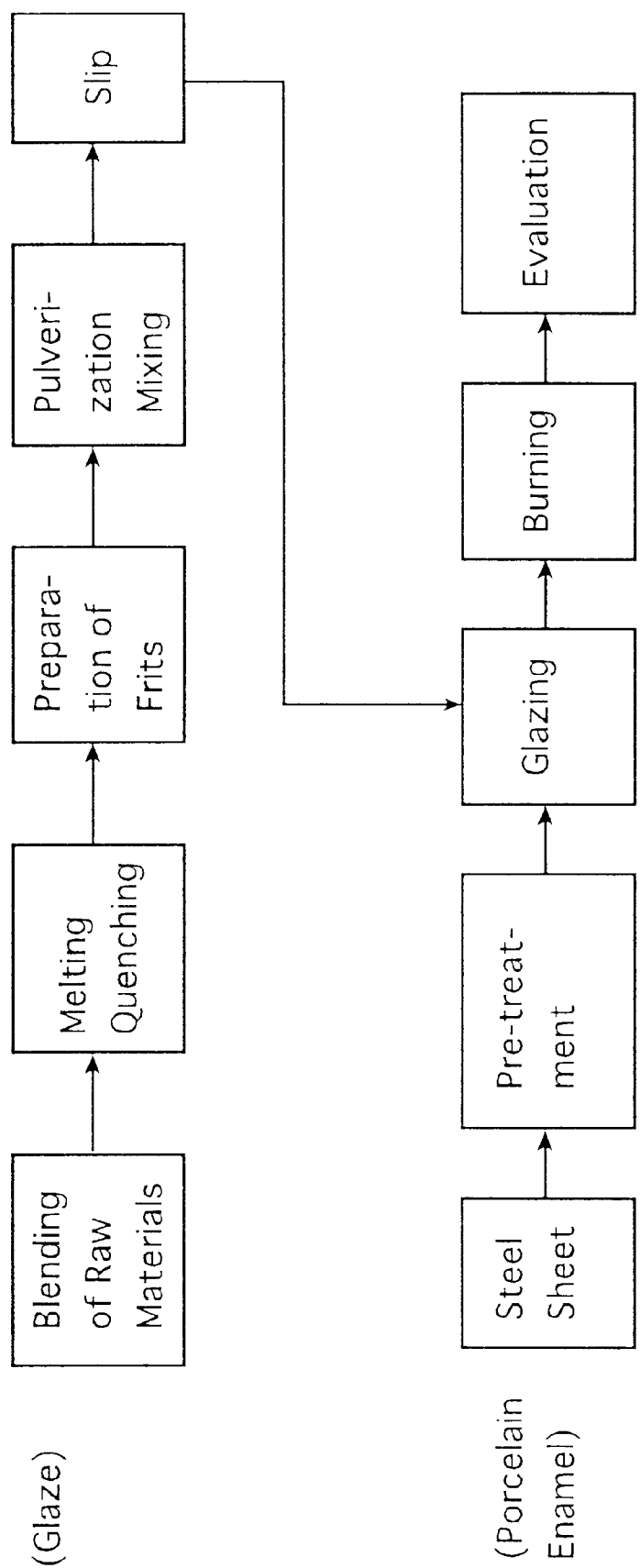

PORCELAIN-ENAMELED STEEL SHEETS AND FRITS FOR ENAMELING

BACKGROUND OF THE INVENTION (a) Field of the Invention

The present invention relates to a porcelain-enameled steel sheet which is excellent, in particular, in porcelain enamel-adhesive properties and which can be used as a marker board, a chalk board, an interior material for tunnel and construction and an exterior finishing material for construction and in particular to a porcelain-enameled steel sheet excellent in the enamel-adhesive properties during and after bending which, in turn, permits the use of the sheet as an interior material for construction after preliminarily burning the porcelain enamel coat and then processing and shaping, chemical durability (chemical resistance), corrosion resistance (end face-rusting inhibitory properties) and glossiness. The present invention also relates to porcelain enamel frits for steel sheets which can be burnt at a low temperature and can impart the foregoing characteristic properties to a porcelain-enameled product after burning.

(b) Description of the Prior Art

There have been known painting and porcelain-enameling methods, as means for imparting various functions such as corrosion resistance, chemical resistance, weatherability and decorative effects to a steel sheet and for improving the lifetime thereof. A porcelain-enameled steel sheet is excellent in, for instance, hardness, weatherability, recovery properties by cleaning, heat resistance and incombustibility as compared with the painted steel sheet, but suffers from a problem in that the forming product is expensive and it may cause peeling of the enamel layer. Therefore, the porcelain-enameled product is in general a so-called post-coated article produced by processing a steel sheet and then porcelain-enameling and the production cost thereof is very high as compared with the so-called pre-coated article which is produced by continuously coil-coating a steel sheet and then subjecting the sheet to fabrication after porcelain-enameling and burning. On the other hand, the film of the painted steel sheet is tolerant, to some extent, to post-processing. Therefore, lightly processed articles may be produced from a pre-coated steel sheet, the production cost can thus be reduced and accordingly, the painted steel sheets have widely been used. In other words, the difference in price between the enameled and painted articles would prevent the expansion of the fields of applications of the enameling technique. However, enameled articles have widely been used in, for instance, hospitals because of their high contamination-inhibitory effects and chemical resistance due to the excellent recovery properties by cleaning. For this reason, there has been desired for the development of a porcelain-enameled steel sheet whose enamel layer is never peeled off even when it is subjected to working through bending after burning the enamel coat as an interior material, in particular, for buildings represented by hospitals wherein sanitation must be considered seriously. In addition, there has also been desired for the development of a porcelain-enameled steel sheet exhibiting resistance to acid rain, i.e., acid resistance and thus capable of being used as an exterior material.

The thickness of the enameled steel sheet is in general not less than 0.3 mm and therefore, the enameled surface thereof undergoes a tensile elongation of not less than 10% during working through bending. The enamel layer is a vitreous one whose rate of elongation is low and thus cannot be saved from any cracking of the enamel layer. Therefore, the enameled steel sheet can withstand working through bending only when it satisfies such essential requirements that the enamel layer is firmly adhered to the steel sheet even if the layer is cracked and that the cracked portions do not gather any rust at all.

Moreover, the baking temperature (burning temperature) for the conventional enamel layer is high on the order of 800 to 900° C. and therefore, the following problems arise: (1) any desired dimensional stability of a product cannot be ensured because of a large extent of heat-deformation when a porcelain enamel film is burnt onto a thin steel sheet and (2) when a plated steel sheet is used as a substrate, the plated layer is melted and flows down because of such a high baking temperature.

Japanese Examined Patent Publication (hereinafter referred to as "J.P. KOKOKU") No. Hei 6-43257 proposes a porcelain-enameled steel sheet capable of being processed through bending after the enamel coating. This sheet is an enameled steel sheet comprising a metal sheet whose surface portion consists of aluminum and which is provided thereon with a porcelain enamel coating layer (hereinafter simply referred to as "enamel layer") whose composition and thickness are specified. If the enameled steel sheet is subjected to severe processing through bending like the processing applied to the painted steel sheet, however, the cracks of the enamel layer arrive even at the underlying aluminum-plating layer although the enamel layer is not fallen off and the plating layer is thus cracked. The aluminum is excellent in corrosion resistance in itself, but in general it does not show any sacrificial corrosion resistance with regard to iron in the air and thus a problem of red rust formation arises as an inevitable consequence, when the plating layer is cracked. In case of processed enameled steel sheets, the steel material is naturally exposed to the air on the end faces and accordingly, the steel sheets suffer from a problem in that the end faces inevitably gather red rust if the underlying plating comprises aluminum.

On the other hand, J.P. KOKOKU No. Hei 5-71667 discloses an enameled steel sheet provided with a layer of a corrosion-resistant material as an undercoat for the enamel layer. This sheet is an enameled steel sheet wherein the enamel layer is applied onto a plated layer of an aluminum-zinc alloy and this steel sheet inhibits the generation of any red rust gathered at, for instance, pinhole portions on the enamel layer by coating, with an enamel, a plated layer containing zinc which has sacrificial corrosion resistance. However, the zinc component present in the aluminum-zinc alloy plating layer is insufficient in the adhesion to the enamel layer and thus the steel sheet suffers from an essential problem such that the enamel layer is peeled off when the sheet is processed through bending after burning the enamel layer. For this reason, any product (pre-coated article) obtained by post-processing, through bending, of a preliminarily enameled steel sheet cannot be produced from the enameled steel sheet of this patent. More specifically, any enameled steel sheet usable in the post-processing through bending cannot be obtained, at all, by carrying out the method disclosed in J.P. KOKOKU No. Hei 5-71667 by itself. Moreover, in this patent, the composition of the porcelain enamel is not fully investigated and accordingly, the resulting enamel layer does not have satisfactory adhesive properties. In addition, the patent does not fully investigate factors affecting the adhesion between the plated layer and the enamel layer. In this respect, the reason why the adhesion of zinc to the enamel layer is insufficient has not yet been clearly elucidated, but J.P. KOKOKU No. Hei 5-71667 discloses as follows: it would be assumed that zinc is severely oxidized with an inorganic oxide (enamel) because of high susceptibility of zinc to oxidation, this accordingly makes, brittle, the reactive layer at the boundary which would contribute to the adhesion and thus the steel sheet of this patent suffers from a problem of the adhesion between the plated layer and the enamel layer and the resistance of the enamel layer per se to peeling off during processing.

Incidentally, the conventional frits for enameling are insufficient in chemical resistance required for porcelain-enameled articles such as acid resistance, alkali resistance and resistance to weathering due to the reaction with moisture. Moreover, these frits suffer from a problem in that they require the use of a relatively high burning temperature.

For instance, J.P. KOKOKU Nos. Hei 6-43256 and Hei 6-43257 propose an enameled article, i.e., an aluminum plated steel sheet produced by burning at a relatively low temperature ranging from 500 to 540° C. using, as frits for enameling, $P_2O_5$ type one which are suitable for low temperature burning.

The foregoing frits for enameling can be burnt at a low temperature, but they are likewise insufficient in chemical resistance required for porcelain-enameled articles, such as acid resistance, alkali resistance and resistance to weathering due to the reaction with moisture.

SUMMARY OF THE INVENTION

Accordingly, an object of the present invention is to provide an aluminum zinc alloy-plated steel sheet covered with a porcelain enamel layer, which has not been able to be produced by the conventional techniques at a low cost and which is excellent in processability through bending after enameling, enamel-adhesive properties, corrosion resistance and glossiness.

Another object of the present invention is to provide frits for enameling which can be burnt at a low temperature and which can impart the foregoing characteristic properties to an aluminum zinc alloy-plated steel sheet to be enameled.

The inventors of this invention have conducted various studies to accomplish the foregoing objects, have found that it is effective to provide an intermediate layer having a specific composition and to use a specific combination of metal oxides in a specific mixing ratio and thus have completed the present invention based on these findings.

According to a first aspect of the present invention, there is provided a porcelain enameled steel sheet which comprises an aluminum-zinc alloy-plated steel sheet and a porcelain enamel coating layer as the upper most layer of the steel sheet, wherein an interstitial layer having good adhesion to both of the plating layer and the enamel coating layer is sandwiched between these two layers.

According to a first preferred embodiment of the first aspect, there is provided an enameled steel sheet wherein the foregoing interstitial layer is a member selected from the group consisting of:

(1) a coating layer comprising at least one member selected from the group consisting of Ni, Co, Mo, Mn, Ni—P, Ni—Co—P and Co—P;

(2) a chromate layer; and (3) a coating layer comprising at least one member selected from the group consisting of zinc phosphate, manganese phosphate and aluminum phosphate.

According to a second preferred embodiment of the first aspect, there is provided an enameled steel sheet wherein the foregoing interstitial layer is a member selected from the group consisting of:

(1) the surface layer on the foregoing aluminum-zinc alloy-plating layer, whose aluminum content is not less than 96% by weight; and (2) the surface layer on the foregoing aluminum-zinc alloy-plating layer, which comprises aluminum, nickel and not more than 1% by weight of zinc.

According to a third preferred embodiment of the first aspect, there is provided an enameled steel sheet wherein the thickness of the enamel coating layer is less than 50 μm.

According to a fourth preferred embodiment of the first aspect, there is provided an enameled steel sheet wherein the enamel coating layer is formed by burning at a temperature of not more than 540° C.

According to a fifth preferred embodiment of the first aspect, there is provided an enameled steel sheet wherein the enamel coating layer comprises $P_2O_5$, $Sb_2O_3$, $Al_2O_3$ and $B_2O_3$; at least one oxide of Group I metal of Periodic Table selected from the group consisting of $Na_2O$, $K_2O$ and $Li_2O$; at least one oxide of Group II metal of Periodic Table selected from the group consisting of ZnO, BaO, CaO and SrO; and at least one oxide of Group IV element of Periodic Table selected from the group consisting of $TiO_2$, $SiO_2$ and $ZrO_2$, in the following contents:

(1) 45 wt %$\leq P_2O_5 \leq$65 wt % 5 wt %$\leq Sb_2O_3 \leq$15 wt % 2 wt %$\leq Al_2O_3 \leq$10 wt % 0.5 wt %$\leq B_2O_3 \leq$5 wt % 7 wt %$\leq Na_2O+K_2O+Li_2O<$15 wt % 7 wt %$\leq$ZnO+BaO+CaO+SrO$\leq$20 wt % 1 wt %$\leq TiO_2+SiO_2+ZrO_2 \leq$10 wt %

(2) 50 wt %$\leq P_2O_5 \leq$65 wt % 7 wt %$\leq Sb_2O_3 \leq$12 wt % 3 wt %$\leq Al_2O_3 \leq$8 wt % 0.5 wt %$\leq B_2O_3 \leq$4 wt % 11.5 wt %$\leq Na_2O+K_2O+Li_2O \leq$13 wt % 11 wt %$\leq$ZnO+BaO+CaO$\leq$14 wt % 1 wt %$\leq TiO_2+SiO_2+ZrO_2 \leq$8 wt %

(3) 50 wt %$\leq P_2O_5 \leq$65 wt % 0 wt %$\leq Sb_2O_3<$5 wt % 3 wt %$\leq Al_2O_3 \leq$8 wt % 0.5 wt %$\leq B_2O_3 \leq$4.6 wt % 9 wt %$\leq Na_2O+K_2O+Li_2O<$15 wt % 9 wt %$\leq$ZnO+BaO+CaO$\leq$18 wt % 3 wt %$\leq TiO_2+SiO_2+ZrO_2 \leq$4.5 wt %

(4) 45 wt %$\leq P_2O_5 \leq$65 wt % 5 wt %$\leq Sb_2O_3 \leq$15 wt % 2 wt %$\leq Al_2O_3 \leq$10 wt % 1 wt %$\leq B_2O_3 \leq$5 wt % 7 wt %$\leq Na_2O+K_2O+Li_2O \leq$20 wt % 7 wt %$\leq$ZnO+BaO+CaO+SrO$\leq$20 wt % 3 wt %$\leq TiO_2+SiO_2+ZrO_2 \leq$10 wt %

According to a sixth preferred embodiment of the first aspect, there is provided an enameled steel sheet wherein the upper portion, i.e., the surface layer on the foregoing aluminum-zinc alloy-plating layer is formed by immersing the foregoing steel sheet in a nickel-containing aqueous solution having a pH of not more than 4, and contains aluminum, nickel and not more than 1% by weight of zinc.

According to a seventh preferred embodiment of the first aspect, there is provided an enameled steel sheet wherein it is processed after burning the enamel coating layer.

According to an eighth preferred embodiment of the first aspect, there is provided an enameled steel sheet excellent in the adhesion between the alloy plating layer and the enamel layer wherein an interstitial layer is formed on the surface of the aluminum-zinc alloy-plated steel sheet and then an enamel coating layer is formed on the alloy plating layer.

In the eighth embodiment of the enameled steel sheet, the interstitial layer formed is preferably one selected from the group consisting of:

(1) a coating layer comprising at least one member selected from the group consisting of Ni, Co, Mo, Mn, Ni—P, Ni—Co—P and Co—P;

(2) a chromate layer; and (3) a coating layer comprising at least one member selected from the group consisting of zinc phosphate, manganese phosphate and aluminum phosphate.

In the eighth embodiment of the enameled steel sheet, the interstitial layer formed is preferably one selected from the group consisting of:

(1) the surface layer on the foregoing aluminum-zinc alloy-plating layer, whose aluminum content is not less than 96% by weight; and (2) the surface layer on the foregoing aluminum-zinc alloy-plating layer, which comprises aluminum, nickel and not more than 1% by weight of zinc.

A second aspect of the present invention relates to frits for enameling which comprise $P_2O_5$, $Sb_2O_3$, $Al_2O_3$ and $B_2O_3$;

at least one oxide of Group I metal of Periodic Table selected from the group consisting of $Na_2O$, $K_2O$ and $Li_2O$; at least one oxide of Group II metal of Periodic Table selected from the group consisting of ZnO, BaO, CaO and SrO; and at least one oxide of Group IV element of Periodic Table selected from the group consisting of $TiO_2$, $SiO_2$ and $ZrO_2$, in the following contents:

(1) 45 wt %$\leq P_2O_5 \leq$65 wt % 5 wt %$\leq Sb_2O \leq$15 wt % 2 wt %$\leq Al_2O_3 \leq$10 wt % 0.5 wt %$\leq B_2O_3 \leq$5 wt % 7 wt %$\leq Na_2O+K_2O+Li_2O<$15 wt % 7 wt %$\leq ZnO+BaO+CaO+SrO \leq$20 wt % 1 wt %$\leq TiO_2+SiO_2+ZrO_2 \leq$10 wt %

(2) 50 wt %$\leq P_2O_5 \leq$65 wt % 7 wt %$\leq Sb_2O_3 \leq$12 wt % 3 wt %$\leq Al_2O_3 \leq$8 wt % 0.5 wt %$\leq B_2O_3 \leq$4 wt % 11.5 wt %$\leq Na_2O+K_2O+Li_2O \leq$13 wt % 11 wt %$\leq ZnO+BaO+CaO \leq$14 wt % 1 wt %$\leq TiO_2+SiO_2+ZrO_2 \leq$8 wt %

(3) 50 wt %$\leq P_2O_5 \leq$65 wt % 0 wt %$\leq Sb_2O_3<$5 wt % 3 wt %$\leq Al_2O_3 \leq$8 wt % 0.5 wt %$\leq B_2O_3 \leq$4.6 wt % 9 wt %$\leq Na_2O+K_2O+Li_2O<$15 wt % 9 wt %$\leq ZnO+BaO+CaO \leq$18 wt % 3 wt %$\leq TiO_2+SiO_2+ZrO_2 \leq$4.5 wt %

BRIEF DESCRIPTION OF THE DRAWING

The attached FIG. 1 is a flow diagram for explaining porcelain-enameling experiments.

DESCRIPTION OF THE PREFERRED EMBODIMENTS

The present invention will hereinafter be described in more detail.

The base material used in the present invention is a steel sheet provided thereon with an aluminum-zinc alloy-plating layer. Regarding the percentages of metals present in the alloy-plating layer, the plating layer comprises 4 to 70% by weight of aluminum and the balance of zinc, the usual contaminants and additive substances which can improve or do not impair the characteristic properties of the film. This is because if the aluminum content is less than 4% by weight, it is not expected to achieve excellent corrosion resistance peculiar to the aluminum-zinc alloy plating. The aluminum content of the alloy plating more preferably ranges from 25 to 70% by weight. If the aluminum content is less than 25% by weight, the melting point of the alloy plating is reduced and accordingly, any corresponding low melting enamel is not easily available, but the cracked portions formed during processing through bending would exhibit high sacrificial corrosion resistance. On the other hand, if the aluminum content exceeds 70% by weight, the cracked portions show insufficient sacrificial corrosion resistance. Examples of the additive substances for the aluminum-zinc alloy plating include Si, La, Ce, Mg and Sn, with Si being particularly preferred from the viewpoint of adhesion of the plating to the base material.

The amount of the aluminum-zinc alloy plating to be applied onto the base material ranges from 80 to 300 $mg/m^2$ on the both sides.

The presence of zinc in the aluminum-zinc alloy plating layer may reduce the adhesion between the plating layer and the enamel coating and therefore, a problem of peeling off of the enamel layer arises, when the resulting enameled steel sheet is processed through bending after enameling. The reason for this has not yet been clearly elucidated, but it would be presumed that zinc undergoes an oxidation reaction with an inorganic oxide coating such as an enamel coating during the enameling step because of high susceptibility of zinc to oxidation and the layer formed through the oxidation reaction would impair the adhesion between the plating layer and the enamel layer at the boundary thereof.

Thus, the inventors of this invention have found that any extreme oxidation of the aluminum-zinc alloy plating with the enamel coating can be inhibited by sandwiching, between the plating layer and the upper most enamel layer, an interstitial layer for controlling the oxidation reaction of these layers and have thus completed the first aspect of the present invention.

In the present invention, as has been discussed above in detail, a porcelain-enameled steel sheet is designed in such a manner that zinc having a sacrificial corrosion-resistant effect, i.e., an effect of inhibiting the generation of red rust due to oxidation of a steel sheet is present in the portion of the alloy plating layer which comes in contact with the steel sheet and aluminum excellent in the adhesion to the porcelain enamel is present, in a high rate, at the boundary between the alloy plating layer and the enamel layer to thus give a precoat type enameled steel sheet which not only has excellent adhesion to the enamel and end face-rusting inhibitory properties, but also has an effect of inhibiting red rust formation at the portions processed through bending.

The interstitial layer which comes in contact with the aluminum-zinc alloy-plated steel sheet can roughly be divided into two groups, i.e., three kinds of coating layers and two kinds of surface layers. The coating layer is excellent in the adhesive properties as compared with the surface layer. First of all, the three kinds of coating layers will be detailed below.

A first interstitial layer is a coating layer comprising at least one member selected from the group consisting of Ni, Co, Mo, Mn, Ni—P, Ni—Co—P and Co—P. All of the foregoing substances, Ni, Co, Mo, Mn, Ni—P, Ni—Co—P and Co—P can inhibit the reaction of the aluminum-zinc alloy plating layer with the enamel layer, with Ni and Ni—P being particularly preferred from the viewpoint of the adhesion to both of these layers and the cost of equipment. In particular, the coating layer of Ni—P is excellent in the adhesion to phosphate type enamel layers. The reason for this has not yet been clearly elucidated, but it would be assumed that phosphate residues are bonded together unlike the case wherein Ni is used alone.

The film may be formed by, for instance, electroplating, electroless plating and displacement plating methods. Alternatively, the film may likewise be formed by coating an aqueous solution containing the foregoing metal ions and then drying. The amount of tis desirably formed is desirably not less than 10 $mg/m^2$ to ensure the inhibition of the reaction of the aluminum-zinc alloy plating layer with the enamel layer. On the other hand, it is not preferred to adjust the amount of the film to be formed to more than 1000 $mg/m^2$ because of an increase in the production cost.

A second interstitial layer is a chromate coating layer. The coating of a chromium oxide serves to inhibit the reaction of the aluminum-zinc alloy plating layer with the enamel layer. The method for forming such a chromate coating is not restricted to any specific one and may be formed by, for instance, a chromate treatment through coating, a chromate treatment through reaction and electrolytic chromate treatment. In the chromate treatment through coating, it is also possible to form a chromate coating film using a treating bath which comprises particles of at least one oxide such as $SiO_2$, $TiO_2$, $ZrO_2$, $Sb_2O_3$, CoO and $MnO_2$ dispersed in the bath. The chromate coating film containing the foregoing oxide particles exhibits further improved adhesion to the enamel layer. Moreover, the coating film is formed while the aluminum-zinc alloy plating layer is etched, in the chromate treatment through reaction and therefore, the adhesion to the enamel layer is further improved by the presence of the coating in cooperation with an anchor effect. If the coated amount of the chromate film is not less than 5 $mg/m^2$ expressed in terms of the amount of metal chromium, the resulting film may completely cover the alloy plating layer and the adhesion-improving effect thereof may be ensured. On the other hand, the application of the film in an amount of more than 1000 mg/m$^2$ is not preferred because of an increase in the production cost.

A third interstitial layer is a coating layer comprising at least one member selected from the group consisting of zinc phosphate, manganese phosphate and aluminum phosphate. Zinc phosphate, manganese phosphate and aluminum phosphate may serve to inhibit any reaction of the aluminum-zinc alloy plating layer with the enamel layer and are excellent, in particular, in the adhesion to phosphate type enamel layers. As has been discussed above, the use of a low melting porcelain enamel is preferred in the present invention and one example thereof is such a phosphate type enamel. The film of zinc phosphate, manganese phosphate or aluminum phosphate can be formed according to any commonly used substrate-treating method referred to as phosphoric acid-conversion treatment. The amount of the coating film is preferably not less than 0.5 g/m$^2$ at which the adhesion-improving effect thereof reveals. On the other hand, if the amount exceeds 5 g/m$^2$, the production cost increases.

Among the foregoing three kinds of interstitial layers, preferred is the first interstitial layer and an Ni—P coating layer is particularly preferred because of its excellent adhesion and flexibility.

Then two kinds of surface layers will be detailed below.

A fourth interstitial layer is the surface layer of the foregoing aluminum-zinc alloy plating layer, i.e., the upper most layer thereof, whose aluminum content is not less than 96% by weight. As has been described above, zinc has poor adhesion to the porcelain enamel and therefore, the enameled steel sheet causes separation at the boundary between the aluminum-zinc alloy plating and the enamel layer upon processing through bending, while aluminum is excellent in the adhesion to the enamel layer. Accordingly, in the present invention, a surface layer having an aluminum content of not less than 96% by weight is formed on the upper portion of the aluminum-zinc alloy plating layer in order to improve the adhesion of the alloy plating layer to the enamel layer while maintaining good corrosion resistance of the alloy plating layer. In this respect, there is not any upper limit in the aluminum content and the excellent adhesion of the plating layer to the enamel layer can be ensured even if the aluminum content in the upper portion of the alloy plating layer is, for instance, 100% by weight.

In this connection, the term "upper portion" herein used means the surface layer, extending to a depth of about 20 Å, of the aluminum-zinc alloy plating layer and the composition of the upper portion is determined by analyzing the portion by Auger electron spectroscopy to obtain mapping images, then calculating an areal ratio and the product of the ratio and the specific gravity to obtain the amount of each component expressed in terms of % by weight.

The aluminum content in the upper portion of the alloy plating layer, i.e., the surface layer can be controlled to not less than 96% by weight by, for instance, an acid-immersion treatment, an anode electrolytic method, application of an aluminum ion-containing solution, application of aluminum oxide (or a sol containing aluminum oxide) and a method for rubbing the alloy plating layer with metal aluminum. The aluminum content in the upper portion of the alloy plating layer can be adjusted to a level of not less than 96% by weight by the acid-immersion treatment since zinc is quite soluble in an acid solution, but aluminum is hardly soluble therein. In case of anode electrolytic treatment, zinc can be dissolved, but aluminum is hardly dissolved because of the presence of the inactive aluminum oxide on the surface and thus the upper portion of the alloy plating layer is rich in aluminum. If combining the acid-immersion treatment and the anode electrolytic method, the upper portion abundant in aluminum can easily be formed and the resulting surface thereof has a shape whose anchor effect is high and shows markedly excellent adhesion to the enamel layer since metal aluminum is not dissolved, but oxidized to thus accelerate the formation of an aluminum oxide film.

Alternatively, if nickel is deposited or adhered only on the zinc surface while leaving aluminum on the surface of the aluminum-zinc alloy plating layer to thus form an upper layer, an aluminum-zinc alloy plating layer excellent in the adhesion to the enamel layer can be produced while effectively preventing any damage of zinc upon processing through bending.

Accordingly, a fifth interstitial layer is the surface layer, i.e., the upper portion of the aluminum-zinc alloy-plating layer, which comprises aluminum, nickel and not more than 1% by weight of zinc. The surface layer preferably has an Al content ranging from 4 to 70% by weight and an Ni content ranging from 30 to 96% by weight and particularly preferred results can be obtained when the surface layer has an Al content ranging from 55 to 70% by weight and an Ni content ranging from 30 to 45% by weight. In this regard, aluminum or nickel may be included, in the surface layer, in the form of an oxide or hydroxide thereof.

Such an upper layer is preferably formed by, for instance, a method wherein the aluminum-zinc alloy plating layer is dipped in a nickel-plating bath. In this case, the nickel-plating bath may comprise additive substances and/or inevitable impurities, which do not impair the adhesion to the plating layer or can improve the adhesion, for instance, phosphoric acid-related substances such as sodium hypophosphite, sulfuric acid and other anions inevitably present in the bath. In particular, if both Ni and phosphoric acid are incorporated into the surface layer of the aluminum-zinc alloy plating layer, the resulting surface layer is excellent in the adhesion to the enamel layer. The reason for this has not yet been clearly elucidated, but it would be presumed that phosphate residues are bonded together unlike the case wherein Ni is used alone. In addition, if the enamel layer is phosphoric acid type enamel layer, there can be provided an enameled steel sheet which exhibits not only excellent chemical durability such as chemical resistance, but also excellent adhesion, corrosion resistance and enameling properties and which is substantially free of any damage of the alloy plating layer. If the zinc content in the upper portion exceeds 1% by weight, the adhesion between the alloy plating layer and the enamel layer is deteriorated.

As other methods for forming such an upper portion of the aluminum-zinc alloy plating layer, which comprises aluminum, nickel and not more than 1% by weight of zinc, there may be listed, for instance, electroplating, electroless plating and displacement plating methods.

Particularly suitable is a method wherein the aluminum-zinc alloy plating layer is immersed in a nickel ion-containing aqueous solution having a pH value of not more than 4 since aluminum is insoluble in the aqueous solution and nickel is easily deposited only on zinc. Examples of such nickel ion-containing aqueous solutions having a pH value of not more than 4 include nickel-plating baths used for plating a steel sheet with nickel. The use of the aqueous solution whose pH value exceeds 4 is not preferred from the viewpoint of the adhesion between the alloy plating layer and the enamel layer since zinc is not dissolved therein, while a part of aluminum is dissolved and accordingly, zinc remains on the surface of the alloy plating layer.

In the first aspect of the present invention, an enamel layer is formed as the upper most layer through an interstitial layer. As porcelain enamel, it is preferred to use those having a low melting point of less than 600° C., while taking into consideration the melting point of the aluminum-zinc alloy plating. Specific examples of porcelain enamels mainly include PbO-based lead borate type and lead borosilicate type ones; $P_2O_5$-based zinc phosphate type and lead phosphate type ones; and $Na_2O$-based soda glass. It is also possible to use porcelain enamels obtained by adding several to several tens kinds of oxides to these basic components. Furthermore, a colored pigment may be added to these porcelain enamels. In this connection, the glazing methods adopted herein are, for instance, a spraying method, a coater method and an electrostatic method.

The composition of the enamel used in the first aspect of the present invention is not limited to any specific one, but when the burning time is, for instance, 5 minutes and the burning temperature exceeds 600° C., the aluminum-zinc alloy plating is completely mixed in the enamel layer and this accordingly results in considerable reduction in, for instance, the corrosion resistance and sacrificial corrosion resistance peculiar to the aluminum-zinc alloy plating. Therefore, it is preferred to use porcelain enamels having a melting point of less than 600° C. in the present invention. Furthermore, the alloy plating layer begins to melt when the temperature exceeds 540° C. and is mixed in the enamel layer and accordingly, the temperature for burning the enamel layer is preferably set at a level of not more than 540° C., in particular when the enamel layer is formed only on one side.

The enamel layer sometimes caused a change in its appearance during burning and the decorative effect thereof was impaired even when using an enamel capable of being burnt at a low temperature of not more than 530° C.

To eliminate these drawbacks, it is necessary to control the burning temperature to not more than 520° C.

If the enamel layer is burnt at a temperature higher than the melting point of the alloy plating, the molten plating is dripping from the plating layer during burning the enamel in a furnace, the installation is thus adversely affected, the plating on the back face of the article is damaged, the corrosion resistance and sacrificial corrosion resistance thereof are also deteriorated and the article would accordingly gather red rust. The alloy plating layer on the back face which is free of any enamel layer is not provided with the foregoing specific upper layer, but may have such upper portion. The enameled steel sheet according to the present invention is an aluminum-zinc alloy-plated steel sheet excellent in corrosion resistance and sacrificial corrosion resistance and therefore, the sheet is not necessarily provided with an enamel layer on the back face. When the enamel layer is formed only on the surface, the cost required for the formation of the enamel layer can considerably be reduced. In this case, the enamel layer is preferably burnt at a low temperature at which the plating layer is never damaged.

The thickness of the enamel layer is not particularly restricted, but is in general not less than 50 $\mu$m. In particular, when the resulting enameled steel sheet is processed through bending, however, the thickness of the enamel layer is preferably adjusted to a level of not more than 50 $\mu$m to thus further improve the adhesion thereof to the aluminum-zinc alloy plating layer. The thermal expansion coefficients of the steel sheet and the enamel layer differ from each other and accordingly, the steel sheet surface would be stressed at the boundary between the surface and the enamel layer upon cooling immediately after the burning of the enamel layer. The thicker the enamel layer, the higher the stress generated at the boundary and the adhesion therebetween is thus reduced. Moreover, if the steel sheet is processed through bending, the thicker the enamel layer, the larger the cracks formed on the surface of the enamel layer.

Method for Quality Evaluation of Frits for Enameling

The inventors of this invention adopted the following methods to inspect enameling frits for various properties (such as softening point, chemical resistance). This is because the usual method requires a large number of steps as shown in FIG. 1 and a long period of time for performing these experiments. The following methods are simplified methods for the evaluation of the quality of enameling frits (such as softening point, chemical resistance) within a short period of time.

(1) Determination of Softening Point

Frits for enameling were pulverized to thus obtain sample powder which could pass through a sieve having a mesh size of 74 $\mu$m (mesh No.200) and could not pass through a sieve having a mesh size of 44 $\mu$m (mesh No.325).

The foregoing powder was formed into a test cone according to "Testing method for refractoriness of refractory brick" as defined in JIS R2204. The test cone was heated, followed by determining the temperature at which the tip thereof came in contact with a cradle. This temperature is defined to be "softening point" of the cone or the frits used. It could be concluded based on the results obtained by various checking experiments that the softening point of the frits should be adjusted to not more than 490° C. in order to make it possible to burn the enamel layer at a temperature of not more than 530° C.

(2) Determination of Chemical Resistance

The chemical resistance was evaluated by converting frits for enameling into pellets through burning, then dipping them in an acidic solution (such as a 18% hydrochloric acid aqueous solution) or an alkali solution (such as a 20% aqueous solution of sodium hydroxide) for one hour and determining the rate of weight loss observed before and after the immersion.

It was concluded, based on the results of various checking experiments, that the rate of weight loss observed in the foregoing immersion test using an acidic or alkali solution should be adjusted to a level of not more than 1% to make it possible to ensure a rate of residual glossiness, in the test for chemical resistance (acid resistance, alkali resistance) as specified in JIS R4301, of not less than 90%.

The second aspect of the present invention relates to frits for enameling which can be divided into three kinds. These three kinds of the frit for enameling each comprises $P_2O_5$, $Sb_2O_3$, $Al_2O_3$ and $B_2O_3$; at least one oxide of Group I metal of Periodic Table selected from the group consisting of $Na_2O$, $K_2O$ and $Li_2O$; at least one oxide of Group II metal of Periodic Table selected from the group consisting of ZnO, BaO, CaO and SrO; and at least one oxide of Group IV element of Periodic Table selected from the group consisting of $TiO_2$, $SiO_2$ and $ZrO_2$, but is free of $PbO_2$.

The frits permit the low temperature burning of the enamel layer at a temperature of not more than 530° C. and the production of enameled articles having improved characteristics such as chemical resistance (chemical durability) and corrosion resistance by appropriately changing the compositional ratio of the foregoing components. First of all, the compositions of two kinds of frits for enameling will be detailed below, which are free of PbO, which can be burnt at a low temperature of 530° C. or 520° C. and which can provide enameled articles having considerably improved chemical resistance (chemical durability).

The first and second frits for enameling have a $P_2O_5$ content extending over a wide range and a relatively high $Sb_2O_3$ content.

$P_2O_5$ is a component for forming a glass phase in the enamel layer of the present invention and forms a network structure.

The content of $P_2O_5$ present in the frits for enameling should be in the range of from 45 to 65 wt % from the viewpoint of the low temperature burning of the enamel layer. This is because, if the $P_2O_5$ content is less than 45 wt %, the resulting frits requires a high burning temperature and the enamel layer formed from the frits cannot be burnt at a low temperature of not more than 530° C., while if the $P_2O_5$ content exceeds 65 wt %, the resulting slip causes solidification during pulverization in a ball mill in the step for preparing the same. The $P_2O_5$ content of the frits preferably ranges from 50 to 65 wt %.

$P_2O_5$ comprises, in its molecular state, double bonded oxygen atoms and therefore, it has poor chemical durability and exhibits strong volatility. However, $P_2O_5$ can show characteristic properties required for forming an enamel layer if the following components are used in combination with the $P_2O_5$.

$Sb_2O_3$ is a component which can affect the chemical durability of an enamel layer. More specifically, the rate of weight loss of the enamel is increased after an acid resistance test as the added amount of $Sb_2O_3$ increases, but the softening point of the resulting frits for enameling is conversely reduced. For this reason, the $Sb_2O_3$ content in the frits should be limited to the range of from 5 to 15 wt %. More specifically, if the $Sb_2O_3$ content is less than 5 wt %, the resulting enamel has a high burning temperature and thus the enamel layer cannot be burnt at a low temperature on the order of not more than 530° C., while if the content exceeds 15 wt %, the resulting enamel layer does not show acid resistance peculiar thereto. The $Sb_2O_3$ content preferably ranges from 7 to 12 wt % and in particular, if it ranges from 8 to 9.5 wt %, the resulting enamel layer can be burnt at a temperature on the order of not more than 520° C. and has further improved acid resistance.

$Al_2O_3$ is a component which has an effect on the mechanical properties and chemical durability of the resulting enamel layer and the content thereof in the frits should fall within the range of from 2 to 10 wt %. This is because if the $Al_2O_3$ content is less than 2 wt %, the resulting enamel layer never exhibit desired mechanical properties and chemical durability. On the other hand, if it exceeds 10 wt %, the enamel layer requires the use of a higher burning temperature and thus cannot be burnt at a low temperature on the order of not more than 530° C.

If the $Al_2O_3$ content falls within the range of from 3 to 8 wt %, the resulting frits can be burnt at a low temperature of not more than 520° C. and can show improved acid resistance.

In particular, if the $Al_2O_3$ content is not less than 4 wt % and not more than 6 wt %, the resulting frits can be burnt at a lower temperature and can show more improved acid resistance.

$B_2O_3$ is a component which permits the reduction of the burning temperature for the enamel layer and has an influence on the glossiness thereof and the content thereof in the frits should fall within the range of from 0.5 to 5 wt %. This is because if the $B_2O_3$ content is less than 0.5 wt %, the resulting enamel layer has a reduced glossiness, requires the use of a higher burning temperature and cannot be burnt at a low temperature of not more than 530° C., while if it exceeds 5 wt %, the resulting enamel layer has poor acid resistance. The $B_2O_3$ content preferably ranges from 0.5 to 2 wt %. If the content falls within this range, the resulting enamel layer can be burnt at a low temperature and has good acid resistance.

$Na_2O$, $K_2O$ and $Li_2O$ are components which have influence on the reduction of the enamel-burning temperature and the glossiness and chemical durability of the enamel and therefore, the overall content of at least one member selected from the group consisting of $Na_2O$, $K_2O$ and $Li_2O$ should be not less than 7 wt % and less than 15 wt %.

If the overall content of these three components is less than 7 wt %, the resulting enamel has a reduced glossiness and cannot be burnt at a low temperature of not more than 530° C. In addition, to make the burning of the enamel at a temperature of not more than 520° C. practicable, the total content of the three components should be not less than 11.5 wt % and not more than 13 wt %.

ZnO, BaO, CaO and SrO are components which affect the chemical durability, mechanical properties and coefficient of thermal expansion of the resulting enamel and the overall content of at least one member selected from the group consisting of ZnO, BaO, CaO and SrO should be limited to the range of from 7 to 20 wt %.

If the overall content of these four components is less than 7 wt %, the resulting enamel never shows the desired chemical durability and mechanical properties. Contrary to this, if the overall content thereof exceeds 20 wt %, the resulting enamel not only requires the use of a high burning temperature and cannot burnt at a low temperature of not more than 530° C., but also has an increased coefficient of thermal expansion and accordingly, the enamel layer is cracked because of an increase of the difference between the thermal expansion coefficients of the enamel layer and the steel sheet.

To make the burning of the enamel at a temperature of not more than 520° C. practicable, the overall content of the foregoing four components must fall within the range of from 11 to 14 wt %. If the overall content thereof falls within the range herein defined, the resulting enamel layer can be burnt at a low temperature of not more than 520° C. and shows desired acid resistance.

Finally, $TiO_2$, $SiO_2$ and $ZrO_2$ are components which can affect the chemical durability and mechanical properties of the resulting enamel and the overall content of at least one member selected from the group consisting of $TiO_2$, $SiO_2$ and $ZrO_2$ should be in the range of from 1 to 10 wt %. This is because if the overall content of these three components is less than 1 wt %, the resulting enamel layer never shows desired chemical durability and mechanical properties, while if the overall content thereof exceeds 10 wt %, the resulting enamel requires the use of a higher burning temperature and thus cannot be burnt at a low temperature of not more than 530° C. The overall content preferably ranges from 1 to 8 wt %. If the overall content is limited to the range of from 3 to 6 wt %, the resulting enamel can be burnt at a low temperature of not more than 520° C. and has more excellent acid resistance.

The third frits for enameling permits the formation of en enamel layer having a high rate of residual gloss after subjecting it to a chemical resistance test and capable of being burnt at a low temperature. The third frits for enameling has a content of the oxide of Group IV element falling within a narrow range and has a low $Sb_2O_3$ content.

The $P_2O_5$ content in the frits should be limited to the range of from 50 to 65 wt %. This is because if the content is less than 50 wt %, the resulting enamel layer has a high softening point and shows a high rate of weight loss in the immersion test in an acidic or alkaline solution, while if it exceeds 65 wt %, the resulting slip causes solidification during pulverization in a ball mill, in the step for preparing the same.

$Sb_2O_3$ is a component which has an effect on the chemical durability of the resulting enamel layer and the enamel layer shows an increase in the rate of weight loss after a test for acid resistance as the added amount of $Sb_2O_3$ increases, but the resulting frits for enameling has a reducing softening point. For this reason, if the frits are required to have chemical resistance, $Sb_2O_3$ is not added to the frits and insufficiency in the burning temperature reduction due to the absence of $Sb_2O_3$ can be compensated by the addition of other components as will be described below, i.e., $B_{2O3}$, $Na_2O$, $K_2O$, $Li_2O$, ZnO, BaO and CaO.

In case where the enameled article is required to have both excellent chemical resistance and a reduced burning temperature, $Sb_2O_3$ is added to the frits. In this regard, the addition thereof permits the reduction of the softening point of the frits for enameling, but the content of $Sb_2O_3$ should be limited to less than 5 wt % in order to adjust the rate of weight loss after a test for acid resistance to a desired level of not more than 1 wt %.

In such case, more preferably the $Sb_2O_3$ content falls within the range of 0.5 to 5 wt % and in particular, the content should be limited to the range of 0.5 to 2.5 wt %.

The $Al_2O_3$ content should be in the range of from 3 to 8 wt % from the viewpoint of the ability of low temperature burning and the desired acid resistance of the resulting enameled article. This is because if the $Al_2O_3$ content is less than 3 wt %, the resulting enamel layer cannot exhibit the desired acid resistance, while if the content exceeds 8 wt %, the enamel layer cannot be burnt at a low temperature of not more than 530° C.

In particular, if the $Al_2O_3$ content ranges from 4 to 6 wt %, the resulting enamel layer can be burnt at a lower temperature and show higher acid resistance.

The $B_2O_3$ content must be in the range of from 0.5 to 4.6 wt % from the viewpoint of the reduction of the temperature for burning the resulting enamel and the acid resistance of the resulting enameled article. This is because if the $B_2O_3$ content is less than 0.5 wt %, the enamel layer cannot be burnt at a low temperature of not more than 530° C. Contrary to this, if the content exceeds 4.6 wt %, the resulting enamel layer is inferior in the acid resistance. The use of the $B_2O_3$ content ranging from 0.5 to 2 wt % would permit the production of an enamel layer capable of being burnt at a low temperature of not more than 520° C. and excellent in acid resistance.

Regarding the components $Na_2O$, $K_2O$ and $Li_2O$, the overall content of at least one member selected from the group consisting of $Na_2$, $K_2O$ and $Li_2O$ must be not less than 9 wt % and less than 15 wt %, while taking into consideration the reduction of the temperature for burning the resulting enamel and the acid resistance of the resulting enameled article. This is because if the overall content of these three components is less than 9 wt %, the enamel layer cannot be burnt at a low temperature of not more than 530° C., while if the overall content thereof is not less than 15 wt %, the resulting enameled article would have insufficient acid resistance.

Moreover, the overall content of these three components is preferably not less than 13 wt % and less than 15 wt %.

With regard to the components ZnO, BaO and CaO, the overall content of at least one member selected from the group consisting of ZnO, BaO and CaO should be limited to the range of from 9 to 18 wt %, while taking into consideration the burning temperature of the resulting enamel and the acid resistance of the resulting enameled article. This is because if the overall content of these three components is less than 9 wt %, the resulting enamel requires the use of an elevated burning temperature, i.e., it cannot be burnt at a low temperature of not more than 530° C. On the other hand, if the overall content thereof exceeds 18 wt %, the resulting enameled article would have insufficient acid resistance. In particular, the use of the overall content of these three components ranging from 11 to 14 wt % would permit the production of an enamel layer capable of being burnt at a lower temperature and having more improved acid resistance.

In respect of $TiO_2$, $SiO_2$ and $ZrO_2$, the overall content of at least one member selected from the group consisting of $TiO_2$, $SiO_2$ and $ZrO_2$ should be in the range of from 3 to 4.5 wt %, while taking into consideration the ability of low temperature burning of the resulting enamel and the acid resistance of the resulting enameled article. If the overall content of these three components is less than 3 wt %, the resulting enamel does not have desired acid resistance, while if it exceeds 4.5 wt %, the enamel layer cannot be burnt at a low temperature of not more than 530° C.

Raw Materials and Production Method of the Frits for Enameling According to the Present Invention Raw materials for frits according to the present invention which can provide an enamel layer, capable of being burnt at a low temperature and having high chemical resistance, are not restricted to specific ones inasmuch as they can form, through burning, the foregoing various kinds of oxides or mixture thereof.

Specific examples of such raw materials include ammonium hydrogen phosphate, sodium hydrogen phosphate, ammonium dihydrogen phosphate, sodium dihydrogen phosphate, aluminum oxide, antimony oxide, boric acid (anhydride), sodium carbonate, sodium silicate, potassium carbonate, lithium carbonate, zinc oxide, barium carbonate, calcium carbonate, strontium carbonate, titanium oxide, silicic acid (anhydride), zirconium oxide and zircon.

Then the method for preparing the frits for enameling according to the present invention, which can provide an enamel layer capable of being burnt at a low temperature and having high chemical resistance will be described in more detail below. The method of the present invention comprises the following steps:

(1) A step for appropriately selecting raw materials from the substances listed above, weighing out desired amounts thereof and sufficiently pulverizing and mixing the same.

(2) A step for heating and burning the resulting mixture to give a melt thereof;

Alternatively, in the foregoing steps (1) and (2), the raw materials thus blended may be melted without pulverization.

(3) In the final stage of the foregoing step (2), the mixture is heated and burnt at a temperature ranging from 800 to 1200° C. for 30 minutes to 4 hours and more preferably at a temperature ranging from 1000 to 1150° C. for 30 minutes to 2 hours to thus melt the mixture.

In this case, the mixture may, if necessary, be stirred in the middle of the step.

(4) An optional pre-burning step prior to the foregoing melting step; for instance, when using an ammonium salt such as ammonium hydrogen phosphate, the pre-burning method comprises sufficiently mixing it at ordinary temperature and then heating at a temperature ranging from 150 to 500° C. for 30 minutes to 3 hours to thus eliminate the ammonia gas generated.

When moisture-containing powder or carbonates are used as the raw materials, it is also preferred to carry out such a pre-burning treatment.

The solid product obtained in the pre-burning step is then pulverized and subsequently subjected to the foregoing melting step (3). If the raw materials are pre-burnt, the melting step is scarcely accompanied by any gas-generation. Therefore, the melting step is never accompanied by boiling over of the raw material from a crucible due to bubbling, can thus be carried out with safety and frits for enameling having a desired precise composition can be prepared.

(5) A step of immediately quenching the resulting melt by pitching into the water or by pouring it on a thick iron plate. The quenching permits the formation of pulverized glass-like frits and this makes the pulverization in the subsequent step easy.

(6) A step for finely pulverizing the resulting frits using, for instance, a ball mill, a pot mill, an oscillating mill or an automated mortar.

Thus, desired frits for enameling having a low melting point can be prepared.

Method for Glazing the Frits for Enameling According to the Present Invention onto Metal Plates Next, the method for glazing the frits for enameling prepared above onto a steel sheet will be detailed below.

First of all, to the frits for enameling having an ability of low temperature burning, there are added various additives such as Gairome clay, bentonite, ammonium alginate, phosphates such as sodium hexametaphosphate, sodium tripolyphosphate, sodium pyrophosphate, tricalcium phosphate, disodium hydrogen phosphate; coloring pigments and water, followed by pulverization in, for instance, a ball mill to form a slip.

The resulting slip is glazed to a steel sheet by, for instance, a dipping, flow coating, spraying or electrostatic spraying method, followed by burning the coated layer at a temperature of preferably not more than 530° C.

In this case, a drying step may optionally be inserted between the glazing step and the burning step, but the drying step does not have any influence on the characteristic properties and appearance of the resulting enamel layer.

The frits for enameling should satisfy essential requirements such as those for a low softening point, variability of surface gloss and chemical resistance (acid resistance, alkali resistance) as well as a low coefficient of thermal expansion and excellent mechanical properties. Therefore, when enameling operations were carried out using the foregoing frits for enameling according to the present invention, which satisfy the requirements for the composition, as defined above, it was found that the resulting enamel layer did not cause any trouble such as cracking and peeling off.

The frits for enameling according to the present invention are completely free of any harmful substance such as heavy metals and accordingly, do not have any detrimental effect and can be reused without any trouble.

Moreover, as will be proved by the following Examples, the use of the frits for enameling according to the present invention would permit the production of enameled articles excellent in chemical durability, in particular, acid resistance, this requirement being established as quality standard for the enameled article.

The enameled steel sheet of the invention is excellent in adhesion and corrosion resistance which are required for post-bending operations. Therefore, the steel sheet is favorably used in applications which require processing steps after burning of the enamel layer. It is a matter of course that the steel sheet may be used as such in the form of a flat sheet.

The frits for enameling can be applied to the usual steel sheets and plated steel sheets such as aluminum-plated and zinc-iron alloy-plated steel sheets, in addition to the aforementioned aluminum-zinc alloy plated steel sheets. They can likewise be applied to metal sheets other than steel sheets as well as substrates made of materials other than metals.

The effects of the present invention will be described below with reference to the following Examples.

Various test methods and evaluation methods used in the Examples will first be detailed below.

Amount (wt %) of Aluminum Present on the Surface of Plating Layer

Mapping images of Al, Zn present in the upper portion (within a depth of about 20 Å, from the uppermost layer of the surface) of a plating layer were obtained by the auger electron spectroscopy, then an areal ratio was determined and the product of the ratio and the specific gravity was calculated to obtain the amount of each component expressed in terms of "% by weight". In addition, the presence of lead in the enamel layer is shown in Tables 2, 5 and 8 from the viewpoint of the environmental conservation. Moreover, the appearance of the back face of the enamel layer after burning was evaluated in terms of the deteriorated state of the back face due to sags and runs of the plating observed during burning by heating.

Amount of Ni: The Ni counts obtained by the fluorescent X-ray analysis was defined to be the amount of Ni.

Amount of Co: The Co counts obtained by the fluorescent X-ray analysis was defined to be the amount of Co.

Amount of Chromate Film: The Cr counts obtained by the fluorescent X-ray analysis was defined to be the amount of chromate film expressed in terms of the amount of Cr.

Amount of Zinc Phosphate: The weight change of zinc phosphate observed before and after the film-formation was determined by the fluorescent X-ray analysis and the weight change was defined to be the amount of zinc phosphate.

Apearance: The enamel layer of each enameled article was visually observed and the appearance was evaluated according to the following criteria:

○: The enamel layer was sufficient in the surface gloss.

×: The surface gloss of the enamel layer was insufficient.

Acid Resistance: The degree of surface erosion was determined according to the ordinary temperature spot test using citric acid (10% citric acid solution; 15-minute spot) as defined in JIS R 4301-1978, entitled "The Quality Standards for Enameled Products" and evaluated according to the 5-stage criteria: AA, A, B, C and D as specified in the testing method.

Alkali Resistance: The degree of surface erosion was determined according to the test for alkali resistance (10% sodium carbonate solution; 15-minute spot) as defined in JIS R 4301-1978, entitled "The Quality Standards for Enameled Products" and evaluated according to the following criteria:

○: The surface was free of discoloration and any linear marking written with a pencil was not observed.

Δ: There was observed either discoloration or a linear marking written with a pencil.

×: There were observed both discoloration and a linear marking written with a pencil.

Adhesion During Bending: Each sample was bent at a working ratio of 0.5 mmR using a bender capable of bending at an angle of 90 degree. After the bending, the sample was subjected to the cellophane tape-peel test, the pealed state of the enamel layer was visually observed and evaluated according to the following criteria:

⊚: Excellent: no peeling

○: Good: very slightly peeled (peeled area: less than 1%)

Δ: Bad: peeled area: not less than 1% and less than 10%

×: Quite Bad: peeled area: not less than 10%

Adhesive Tensile Test: Two enameled steel sheets were bonded to one another through a thermosetting epoxy adhesive so that the bonded area was equal to 3 cm$^2$, followed by subjecting the bonded sheets to a heat-treatment at 170° C. for 20 minutes. After curing the adhesive, the bonded two enameled steel sheets were pulled from the opposite edges to thus determine the force required for peeling these two sheets, which was defined to be the adhesive tensile strength.

Corrosion Resistance at Bent Portion: The foregoing enameled steel sheet which had been bent was subjected to a cycle test in which each cycle comprised pure water spraying (35° C. for 4 hours), drying (60° C. for 2 hours) and wetting (50° C. for 2 hours) and the steel was visually inspected for generation of red rust after one month.

End Face Corrosion Resistance: Each enameled steel sheet was stored in a thermo-hygrostatic box maintained at 37° C., 95% RH for one month and thereafter each sheet was visually inspected for the presence of red rust on the end faces.

EXAMPLES 1 to 27

An interstitial layer was formed, according to the method specified in Table 1, on an aluminum-zinc alloy-plated (75 g/m$^2$/side; Al content: 55% by weight) oil-free Galbarium steel sheet (AZ150) which was not subjected to any degreasing and acid-washing treatment and which had a thickness of 0.35 mm. Subsequently, the steel sheet was continuously guided to a glazing step by a coil, followed by slip-glazing according to a spraying method using each enamel listed in Table 2 and burning at 460 to 600° C. for 1 to 10 minutes in an electric furnace to form an enamel layer. The characteristics of the resulting enameled steel sheet are summarized in Table 3.

TABLE 1

Methods for Forming Interstitial Layers

| Kind of Interstitial Layer | Method for Forming Interstitial Layer |
|---|---|
| Ni Treatment | Steel sheet was immersed in an aqueous solution containing 40 g/l of nickel sulfate (65° C., pH 3); the amount of Ni adhered to the sheet was changed by variously changing the immersion time. |
| Co Treatment | Steel sheet was immersed in an aqueous solution containing 50 g/l of cobalt sulfate (65° C.). |
| Mo Treatment | Steet sheet was coated with a dispersion of molybdenum oxide in pure water using a roll coater, followed by drying at 100° C. |
| Mn Treatment | Steel sheet was immersed in an aqueous solution containing 20 g/l of sodium permanganate (65° C.). |
| Ni—P Treatment | Steel sheet was immersed in an aqueous solution containing 21 g/l nickel sulfate, 28 g/l lactic acid, 2.3 g/l popionic acid and 21 g/l sodium hypophosphite (60° C., pH 2); the amount of adhered Ni was changed by variously changing the immersion time. |
| Co—P Treatment | Steel sheet was immersed in an aqueous solution containing 15 /gl cobalt sulfate, 60 g/l sodium citrate, 65 g/l ammonium sulfate and 21 g/l sodium hypophosphite (80° C., pH 10). |
| Ni—Co—P Treatment | Steel sheet was immersed in an aqueous solution containing 0.07 mol/l cobalt sulfate, 0.08 mol/1 nickel sulfate, 0.2 mol/1 citric acid, 0.5 mol/1 boric acid and 0.2 mol/l sodium hypophosphite. |
| Chromate Treatment | Steel sheet was coated wit a chromate-treating solution having Cr(III)/Cr(VI) = 1 and $SiO_2/Cr$ = 2 using a roll coater, followed by burning at 200° C. for one min. |
| Zinc Phosphate Treatment | After surface-conditioning, steel sheet was immersed in a phosphate-treating liquid (SD2500, available from Nippon Paint Co., Ltd.). |
| Manganese Phosphate | After surface-conditioning, steel sheet was immersed in a phosphate-treating liquid (Palphos M5, available from Nihon Parkerizing Co., Ltd.). |

Note: The steel sheet is an aluminum-zinc alloy-plated (75 $g/m^2$/side; Al content: 55% by weight) oil free Galbarium steel sheet (AZ150) which is free of degreasing and acid-washing, having a thickness of 0.35 mm.

Note: The steel sheet is an aluminum-zinc alloy-plated (75 $g/m^2$/side; Al content: 55% by weight) oil free Galbarium steel sheet (AZ150) which is free of degreasing and acid-washing, having a thickness of 0.35 mm.

TABLE 2

Compositions of Frits for Enameling

Composition of frits for enameling (wt %)

| | $P_2O_5$ | $Sb_2O_3$ | $Al_2O_3$ | $B_2O_3$ | Oxide of Group I metal | | Oxide of Group II metal | | Oxide of Group IV element | | Others | |
|---|---|---|---|---|---|---|---|---|---|---|---|---|
| 1 | 60 | 10 | 2 | 1 | | 14.9 | ZnO | 10 | | 2.1 | | |
| 2 | 40.1 | 25 | | | | 14.9 | | | PbO | 20 | | |
| 3 | | | | 5 | | 30 | | | $SiO_2$ | 25 | PbO | 40 |
| 4 | 49.17 | | 20.16 | 7.65 | $Na_2O$ | 6.51 | ZnO | 6.78 | $F_2$ | 2.1 | | |
| | | | | | $K_2O$ | 5.16 | | | | | | |
| | | | | | $Li_2O$ | 2.47 | | | | | | |
| 5 | 46.4 | 2.9 | 5.8 | 2.9 | $Na_2O$ | 8 | ZnO | 12 | $SiO_2$ | 0.35 | | |
| | | | | | $K_2O$ | 8 | BaO | 3 | $TiO_2$ | 6.3 | | |
| | | | | | $Li_2O$ | 4 | | | $ZrO_2$ | 0.35 | | |
| 6 | 60.1 | 5 | 5 | 1 | $Na_2O$ | 14.9 | ZnO | 10 | $ZrO_2$ | 4 | | |
| 7 | 50 | 14 | 6 | 1 | $K_2O$ | 14 | BaO | 13 | $ZrO_2$ | 7 | | |
| 8 | | 6.79 | | 2.40 | $Na_2O$ | 2.47 | | | $TiO_2$ | 1.86 | PbO | 68.31 |
| | | | | | $Li_2O$ | 0.53 | | | $SiO_2$ | 11.64 | | |

TABLE 3

Characteristics of Enameled Articles

| Ex. No. | 1st layer (plated undercoat) | 2nd layer (interstitial layer) Kind | 2nd layer Adhered Amt. (mg/m²) | 3rd Layer (enamel layer) Kind | 3rd Layer Thickness | Adhesion upon processing through bending | Adhesive tensile strength (kgf/cm²) | Corrosion Res. at portion processed through bending (formation of red rust) | Res. at end face (formation of red rust) | Chemical Res. Acid Res. | Chemical Res. Alkali Res. |
|---|---|---|---|---|---|---|---|---|---|---|---|
| 1 | Galbarium Steel Sheet | Ni | 50 | 1 | 50 | ○ | 65 | Not Observed | Not Observed | AA | ○ |
| 2 | Galbarium Steel Sheet | Ni | 50 | 1 | 60 | Δ | 60 | Not Observed | Not Observed | AA | ○ |
| 3 | Galbarium Steel Sheet | Ni | 520 | 1 | 34 | ○ | 60 | Not Observed | Not Observed | AA | ○ |
| 4 | Galbarium Steel Sheet | Co | 200 | 1 | 42 | ○ | 51 | Not Observed | Not Observed | AA | ○ |
| 5 | Galbarium Steel Sheet | Mo | 100 | 1 | 45 | ○ | 53 | Not Observed | Not Observed | AA | ○ |
| 6 | Galbarium Steel Sheet | Mn | 50 | 1 | 35 | ○ | 58 | Not Observed | Not Observed | AA | ○ |
| 7 | Galbarium Steel Sheet | Ni—P | 300 | 1 | 42 | ⊙ | 72 | Not Observed | Not Observed | AA | ○ |
| 8 | Galbarium Steel Sheet | Ni—P | 100 | 1 | 30 | ⊙ | 91 | Not Observed | Not Observed | AA | ○ |
| 9 | Galbarium Steel Sheet | Ni—P | 100 | 1 | 80 | ○ | 70 | Not Observed | Not Observed | AA | ○ |
| 10 | Galbarium Steel Sheet | Ni—P | 100 | 4 | 40 | ○ | 60 | Not Observed | Not Observed | C | ○ |
| 11 | Galbarium Steel Sheet | Ni—P | 500 | 1 | 33 | ⊙ | 68 | Not Observed | Not Observed | AA | ○ |
| 12 | Galbarium Steel Sheet | Co—P | 200 | 1 | 40 | ○ | 58 | Not Observed | Not Observed | AA | ○ |
| 13 | Galbarium Steel Sheet | Chromate | 30 | 1 | 41 | ○ | 63 | Not Observed | Not Observed | AA | ○ |
| 14 | Galbarium Steel Sheet | Zinc phosphate | 1000 | 1 | 24 | ○ | 50 | Not Observed | Not Observed | AA | ○ |
| 15 | Galbarium Steel Sheet | Ni | 500 | 2 | 22 | ○ | 60 | Not Observed | Not Observed | AA | Δ |
| 16 | Galbarium Steel Sheet | Ni—P | 300 | 2 | 33 | ⊙ | 100 | Not Observed | Not Observed | AA | Δ |
| 17 | Galbarium Steel Sheet | Chromate | 70 | 2 | 33 | ⊙ | 68 | Not Observed | Not Observed | AA | Δ |
| 18 | Galbarium Steel Sheet | Ni—P | 220 | 3 | 40 | ○ | 65 | Not Observed | Not Observed | AA | Δ |
| 19 | Galbarium Steel Sheet | Chromate | 10 | 3 | 43 | ○ | 59 | Not Observed | Not Observed | AA | Δ |
| 20 | Galbarium Steel Sheet | None | | 1 | 50 | X | 15 | Not Observed | Not Observed | AA | ○ |
| 21 | Galbarium Steel Sheet | None | | 2 | 42 | X | 21 | Not Observed | Not Observed | AA | Δ |

TABLE 3-continued

Characteristics of Enameled Articles

| Ex. No. | 1st layer (plated under-coat) | 2nd layer (interstital layer) Kind | 2nd layer Amt. (mg/m²) | 3rd Layer (enamel layer) Kind | 3rd Layer Thickness | Adhesion upon process-ing through bending | Adhesive tensile strength (kgf/cm²) | Corrosion Res. at portion processed through bending (formation of red rust) | Res. at end face (formation of red rust) | Chemical Res. Acid Res. | Chemical Res. Alkali Res. |
|---|---|---|---|---|---|---|---|---|---|---|---|
| 22 | Galbarium Steel Sheet | None | | 3 | 36 | X | 27 | Not Observed | Not Observed | AA | Δ |
| 23 | Galbarium Steel Sheet | None | | 4 | 36 | X | 23 | Not Observed | Not Observed | C | ○ |
| 24 | Al-Plated Steel Sheet | None | | 1 | 45 | ⊚ | 75 | Observed | Observed | AA | ○ |
| 25 | Al-Plated Steel Sheet | Ni—P | 0 | 1 | 38 | ⊚ | 78 | Observed | Observed | AA | ○ |
| 26 | Al-Plated Steel Sheet | None | | 5 | 30 | ⊚ | 70 | Observed | Observed | C | ○ |
| 27 | Al-Plated Steel Sheet | Ni—P | 0 | 5 | 30 | ⊚ | 70 | Observed | Observed | C | ○ |

EXAMPLES 28 to 51

An interstitial layer was formed, according to the method specified in Table 4, on an aluminum-zinc alloy-plated (75 g/m²/side; Al content: 55% by weight) oil-free Galbarium steel sheet (AZ150) or an aluminum plated oil-free steel sheet having a thickness of 0.35 mm, followed by continuously guiding the steel sheet to a glazing step, slip-glazing according to a spraying method using each enamel defined in Table 2 and burning for 5 minutes to form an enamel layer. The characteristics of the resulting enameled steel sheet are summarized in Table 5.

TABLE 4

Methods for Forming Interstitial Layers

| No. | |
|---|---|
| 1 | Steel sheet was dipped in a 50 g/l sulfuric acid aqueous solution (50° C.) for one minute. |
| 2 | Steel sheet was dipped in a 50 g/l sulfuric acid aqueous solution (50° C.) for 5 seconds. |
| 3 | Steel sheet was anodically electrolyzed for 20 seconds, at a current density of 10A/dm² in a 50 g/l sodium sulfate aqueous solution (50° C.). |
| 4 | Steel sheet was anodically electrolyzed for 10 seconds, at a current density of 30 A/dm² in a 50 g/l sulfuric acid aqueous solution (50° C.). |

Note: The steel material is an aluminum-zinc alloy-plated (75 g/m²/side; Al content: 55% by weight) oil-free steel sheet (AZ150) having a thickness of 0.35 mm; or an aluminum-plated oil-free steel sheet.

TABLE 5

| | | Treatment prior to enameling Interstitial layer | | | Enamel layer | | | | Characteristics of Enameled Articles | | | | | |
|---|---|---|---|---|---|---|---|---|---|---|---|---|---|---|
| | | | | | | | | | Environmental assurance | Appearance of back face | Adhesion upon | Adhesive tensile | Corrosion res. at portion processed through | Corrosion res. at end face | Chemical res. |
| Ex. No. | Plated under coat | Kind | Sur. Al cont. (wt %) | Kind | Enameled face | Burning temp. (°C.) | Thickness (μm) | | (Pb cont. in glaze) | (sags or runs of plating) | processing by bending | strength (kgf/cm²) | bending (formation of red rust) | (formation of red rust) | Acid res. / Alkali res. |
| 28 | Galbarium steel sheet | 1 | 97 | 6 | Both faces | 500 | 48 | | Pb-free | — | ◯ | 75 | Not observed | Not observed | AA / ◯ |
| 29 | Galbarium steel sheet | 1 | 97 | 7 | Both faces | 480 | 25 | | Pb-free | — | ◯ | 78 | Not observed | Not observed | AA / ◯ |
| 30 | Galbarium steel sheet | 1 | 97 | 2 | Both faces | 520 | 35 | | Containing Pb | — | ◯ | 80 | Not observed | Not observed | AA / △ |
| 31 | Galbarium steel sheet | 1 | 97 | 3 | Both faces | 520 | 70 | | Containing Pb | — | △ | 51 | Not observed | Not observed | AA / △ |
| 32 | Galbarium steel sheet | 1 | 97 | 8 | Both faces | 520 | 33 | | Containing Pb | — | ◯ | 63 | Not observed | Not observed | AA / △ |
| 33 | Galbarium steel sheet | 1 | 97 | 5 | Both faces | 560 | 45 | | Pb-free | — | ◯ | 68 | Not observed | Not observed | C / ◯ |
| 34 | Galbarium steel sheet | 3 | 96 | 6 | Both faces | 500 | 42 | | Pb-free | — | ◯ | 65 | Not observed | Not observed | AA / ◯ |
| 35 | Galbarium steel sheet | 3 | 96 | 7 | Both faces | 480 | 30 | | Pb-free | — | ◯ | 67 | Not observed | Not observed | AA / ◯ |
| 36 | Galbarium steel sheet | 4 | 99 | 6 | Both faces | 500 | 80 | | Pb-free | — | △ | 53 | Not observed | Not observed | AA / ◯ |
| 37 | Galbarium steel sheet | 4 | 99 | 7 | Both faces | 480 | 30 | | Pb-free | — | ⊙ | 84 | Not observed | Not observed | AA / ◯ |
| 38 | Galbarium steel sheet | 4 | 99 | 6 | One face | 500 | 33 | | Pb-free | good | ⊙ | 82 | Not observed | Not observed | AA / ◯ |
| 39 | Galbarium steel sheet | 4 | 99 | 7 | One face | 480 | 30 | | Pb-free | good | ⊙ | 84 | Not observed | Not observed | AA / ◯ |
| 40 | Galbarium steel sheet | 4 | 99 | 8 | One face | 520 | 80 | | Containing Pb | good | ◯ | 63 | Not observed | Not observed | AA / △ |

TABLE 5-continued

| | | Treatment prior to enameling Interstitial layer | | Enamel layer | | | Characteristics of Enameled Articles | | | | | Chemical res. | |
|---|---|---|---|---|---|---|---|---|---|---|---|---|---|
| | | | Sur. Al | | | | Environmental | Appearance | Adhesion upon | Adhesive tensile | Corrosion res. at portion | Corrosion res. at | | |
| Ex. No. | Plated under coat | Kind | cont. (wt %) | Kind | Enamel- ed face | Burning temp. (° C.) | Thick- ness (μm) | assurance (Pb cont. in glaze) | of back face (sags or runs of plating) | processing by bending | strength (kgf/cm²) | processed through bending (formation of red rust) | end face (formation of red rust) | Acid res. | Alkali res. |
| 41 | Galbarium steel sheet | 4 | 99 | 5 | One face | 560 | 24 | Pb-free | Deteriorated | ○ | 50 | Not observed | Not observed | C | ○ |
| 42 | Galbarium steel sheet | 2 | 93 | 2 | One face | 520 | 22 | Containing Pb | good | △ | 43 | Not observed | Not observed | AA | △ |
| 43 | Galbarium steel sheet | 2 | 93 | 8 | One face | 600 | 33 | Containing Pb | Severely deteriorated | X | 30 | Observed | Observed | AA | △ |
| 44 | Galbarium steel sheet | None | 80 | 6 | One face | 500 | 33 | Pb-free | good | △ | 35 | Not observed | Not observed | AA | ○ |
| 45 | Galbarium steel sheet | None | 80 | 2 | One face | 520 | 40 | Containing Pb | good | △ | 33 | Not observed | Not observed | AA | △ |
| 46 | Galbarium steel sheet | None | 80 | 8 | One face | 520 | 43 | Containing Pb | good | X | 15 | Not observed | Not observed | AA | △ |
| 47 | Galbarium steel sheet | None | 80 | 5 | One face | 560 | 50 | Pb-free | Deteriorated | X | 27 | Not observed | Not observed | C | ○ |
| 48 | Al-plated steel sheet | None | 100 | 6 | One face | 500 | 36 | Pb-free | good | ⊚ | 75 | Observed | Observed | AA | ○ |
| 49 | Al-plated steel sheet | None | 100 | 6 | One face | 500 | 36 | Pb-free | good | ⊚ | 78 | Observed | Observed | AA | ○ |
| 50 | Al-plated steel sheet | None | 100 | 5 | One face | 560 | 45 | Pb-free | good | ⊚ | 70 | Observed | Observed | C | ○ |
| 51 | Al-plated steel sheet | None | 100 | 5 | One face | 560 | 38 | Pb-free | good | ⊚ | 71 | Observed | Observed | C | ○ |

EXAMPLES 52 to 76

An interstitial layer was formed, according to the method specified in Table 6, on an aluminum-zinc alloy-plated (75 g/m$^2$/side; Al content: 55% by weight) oil-free Galbarium steel sheet (AZ150) or an aluminum plated oil-free steel sheet having a thickness of 0.35 mm, followed by continuously guiding the steel sheet to a glazing step, slip-glazing according to a spraying method using each enamel defined in Table 2 and burning for 5 minutes to form an enamel layer. The characteristics of the resulting enameled steel sheet are summarized in Table 7.

TABLE 6

| No. | Methods for Forming Interstitial Layers |
|---|---|
| 1 | Steel sheet was immersed in an aqueous solution containing 21 g/l nickel sulfate, 28 g/l lactic acid, 2.3 g/l propionic acid and 21 g/l sodium hypophosphite (60° C., pH 1.5). |
| 2 | Steel sheet was immersed in an aqueous solution containing 50 g/l nickel sulfate (65° C., pH 2) |
| 3 | Steel sheet was immersed in an aqueous solution containing 40 g/l nickel sulfate and 4 g/l sodium hypophosphite (70° C., pH 3.). |
| 4 | Steel sheet was immersed in an aqueous solution containing 40 g/l nickel sulfate, 50 g/l sodium hypophosphite and 100 g/l citric acid (50° C., pH 3). |

Note: The steel sheet is an aluminum-zinc alloy-plated (75 g/m$^2$/side; Al content: 55% by weight) oil-free steel sheet (AZ150) having a thickness of 0.35 mm; or an aluminum-plated oil-free steel sheet.

TABLE 7

Characteristics of Enameled Articles

| Ex. No. | Plated under coat | Treatment prior to enameling Interstitial layer Kind | Sur. Zn cont. (wt %) | Kind | Enamel layer Enameled face | Burning temp. (°C) | Thickness (μm) | Environmental assurance (Pb cont. in enamel) | Appearance of back face (sags or runs of plating) | Adhesion upon processing by bending | Adhesive tensile strength (kgf/cm²) | Corrosion res. at portion processed through bending (formation of red rust) | Corrosion res. at end face (formation of red rust) | Chemical res. Acid res. | Alkali res. |
|---|---|---|---|---|---|---|---|---|---|---|---|---|---|---|---|
| 52 | Galbarium steel sheet | 1 | 0.3 | 6 | Both faces | 500 | 48 | Pb-free | — | ⊙ | 95 | Not observed | Not observed | AA | ○ |
| 53 | Galbarium steel sheet | 1 | 0.3 | 7 | Both faces | 480 | 25 | Pb-free | — | ⊙ | 100 | Not observed | Not observed | AA | ○ |
| 54 | Galbarium steel sheet | 1 | 0.3 | 2 | Both faces | 520 | 35 | Containing Pb | — | ○80 | Not obs. | Not observed | AA served | A | A |
| 55 | Galbarium steel sheet | 1 | 0.3 | 2 | Both faces | 520 | 70 | Containing Pb | — | △ | 51 | Not observed | Not observed | AA | △ |
| 56 | Galbarium steel sheet | 1 | 0.3 | 3 | Both faces | 480 | 42 | Containing Pb | — | ○ | 72 | Not observed | Not observed | AA | △ |
| 57 | Galbarium steel sheet | 1 | 0.3 | 8 | Both faces | 520 | 33 | Containing Pb | — | ○ | 82 | Not observed | Not observed | AA | △ |
| 58 | Galbarium steel sheet | 1 | 0.3 | 5 | Both faces | 560 | 45 | Pb-free | — | ○ | 68 | Not observed | Not observed | C | ○ |
| 59 | Galbarium steel sheet | 2 | 0.7 | 6 | Both faces | 500 | 42 | Pb-free | — | ○ | 65 | Not observed | Not observed | AA | ○ |
| 60 | Galbarium steel sheet | 2 | 0.7 | 7 | Both faces | 480 | 30 | Pb-free | — | ○ | 67 | Not observed | Not observed | AA | ○ |
| 61 | Galbarium steel sheet | 3 | 0.5 | 6 | Both faces | 500 | 80 | Pb-free | — | ○ | 53 | Not observed | Not observed | AA | ○ |
| 62 | Galbarium steel sheet | 3 | 0.5 | 7 | Both faces | 480 | 30 | Pb-free | — | ⊙ | 105 | Not observed | Not observed | AA | ○ |
| 63 | Galbarium steel sheet | 3 | 1 | 6 | Both faces | 500 | 33 | Pb-free | — | ○ | 73 | Not observed | Not observed | AA | ○ |
| 64 | Galbarium steel sheet | 4 | 1 | 7 | Both faces | 480 | 30 | Pb-free | — | ○ | 75 | Not observed | Not observed | AA | ○ |

TABLE 7-continued

Characteristics of Enameled Articles

| Ex. No. | Plated under coat | Treatment prior to enameling Interstitial layer Kind | Sur. Zn cont. (wt %) | Enamel layer Kind | Enameled face | Burning temp. (° C.) | Thickness (μm) | Environmental assurance (Pb cont. in enamel) | Appearance of back face (sags or runs of plating) | Adhesion upon processing by bending | Adhesive tensile strength (kgf/cm²) | Corrosion res. at portion processed through bending (formation of red rust) | Corrosion res. at end face (formation of red rust) | Chemical res. Acid res. | Alkali res. |
|---|---|---|---|---|---|---|---|---|---|---|---|---|---|---|---|
| 65 | Galbarium steel sheet | 3 | 0.3 | 6 | One face | 500 | 80 | Pb-free | Good | △ | 53 | Not observed | Not observed | AA | ○ |
| 66 | Galbarium steel sheet | 3 | 0.3 | 7 | One face | 520 | 24 | Pb-free | Good | ⊚ | 101 | Not observed | Not observed | AA | ○ |
| 67 | Galbarium steel sheet | 1 | 0.3 | 2 | One face | 500 | 22 | Containing Pb | Good | ⊚ | 43 | Not observed | Not observed | AA | △ |
| 68 | Galbarium steel sheet | 1 | 0.3 | 5 | One face | 560 | 33 | Pb-free | Deteriorated | ⊚ | 30 | Not observed | Not observed | C | ○ |
| 69 | Galbarium steel sheet | None | 45 | 6 | One face | 500 | 33 | Pb-free | Good | △ | 35 | Not observed | Not observed | AA | ○ |
| 70 | Galbarium steel sheet | None | 45 | 2 | One face | 520 | 40 | Pb-free | Good | △ | 33 | Not observed | Not observed | AA | △ |
| 71 | Galbarium steel sheet | None | 45 | 8 | One face | 520 | 43 | Containing Pb | Good | X | 15 | Not observed | Not observed | AA | △ |
| 72 | Galbarium steel sheet | None | 45 | 5 | One face | 560 | 50 | Pb-free | Deteriorated | X | 27 | Not observed | Not observed | C | ○ |
| 73 | Al-plated steel sheet | None | 0 | 6 | One face | 500 | 36 | Pb-free | Good | ⊚ | 75 | Observed | Observed | AA | ○ |
| 74 | Al-plated steel sheet | None | 0 | 6 | One face | 500 | 36 | Pb-free | Good | ⊚ | 75 | Observed | Observed | AA | ○ |
| 75 | Al-plated steel sheet | None | 0 | 5 | One face | 560 | 45 | Pb-free | Good | ⊚ | 70 | Observed | Observed | C | ○ |
| 76 | Al-plated steel sheet | None | 0 | 5 | One face | 560 | 38 | Pb-free | Good | ⊚ | 71 | Observed | Observed | C | ○ |

EXAMPLES 77 to 92

Frits for enameling having a variety of compositions as shown in Table 8 were prepared according to the following production steps using, as raw materials, ammonium hydrogen phosphate, aluminum oxide, antimony oxide, boric acid anhydride, sodium carbonate, potassium carbonate, lithium carbonate, zinc oxide, barium carbonate, calcium carbonate, strontium carbonate, titanium oxide, silicic acid anhydride and zirconium oxide:

(1) Appropriate raw materials were selected from the substances listed above, followed by weighing out and blending them so that the resulting mixture had a desired composition and then sufficient mixing thereof at ordinary temperature.

(2) The resulting mixture was reacted at 350° C. for 2 hours to thus eliminate the ammonia gas generated.

(3) The resulting solid material was pulverized, followed by heating and burning in a furnace to give a melt and stirring the melt.

The solid material was heated and burnt at 1100 °C. for one hour at the final stage of the melting step.

(4) The resulting melt was immediately quenched by pouring it into water to thus give pulverized glass-like frits.

(5) The resulting frits were finely pulverized in a pot mill to give frits for enameling.

Then, to 100 parts by weight of the frits for enameling thus obtained and having a composition shown in Table 8, there was added 20 parts by weight of rutile titanium oxide as a titanium pigment to give a principal ingredient, followed by adding, to the principal ingredient, one part by weight of a dispersant (sodium pyrophosphate) and 35 parts by weight of water to thus form a slip.

Each slip was applied to the surface of an alloyed molten zinc-plated steel sheet, followed by burning at 530° C. to give an enamel layer having a thickness of 50 μm.

The results of the quality-evaluation of the resulting enameled article are listed in Table 8 along with the compositions of the frits for enameling used.

The frits for enameling according to the present invention can be used for producing not only enameled articles which are required for ensuring the desired acid resistance of not less than the rank A, but also various other enameled articles.

TABLE 8

Compositions of Frits for Enameling and Characteristics of Enameled Articles

| Ex. No. | $P_2O_5$ | $Sb_2O_3$ | $Al_2O_3$ | $B_2O_3$ | $Na_2O$ | $K_2O$ | $Li_2O$ | Total ($Na_2O+K_2O+Li_2O$) | ZnO | BaO | CaO | SrO | Total (ZnO+BaO+CaO+SrO) |
|---|---|---|---|---|---|---|---|---|---|---|---|---|---|
| 77 | 51 | 5 | 3 | 3 | 14 | | | 14 | 14 | | | | 14 |
| 78 | 49 | 6 | 2 | 1 | | 14 | | 14 | | 20 | | | 20 |
| 79 | 45 | 12 | 7 | 4 | | | 14 | 14 | | | 9 | | 9 |
| 80 | 53 | 15 | 6 | 1 | 8 | 6 | | 14 | | | | 10 | 10 |
| 81 | 55 | 10 | 6 | 1 | | 6 | 8 | 14 | 6 | 4 | | | 10 |
| 82 | 59 | 5 | 6 | 1 | 7 | | 7 | 14 | | | 5 | 5 | 10 |
| 83 | 60 | 9 | 5 | 1 | 5 | 3 | 4 | 12 | 6 | | 2 | 1 | 9 |
| 84 | 65 | 5.5 | 10 | 0.5 | 3 | 1 | 4 | 8 | 3 | 2 | 1 | 1 | 7 |
| 85 | 41.5 | 5 | 6 | 5 | 20 | | | 20 | 22 | | | | 22 |
| 86 | 41 | 10 | 12 | 4 | | 20 | | 20 | | 10 | | | 10 |
| 87 | 44 | 18 | 6 | 7 | | | 14 | 14 | | | 8 | | 8 |
| 88 | 46 | 10 | 1 | 1 | 21 | | | 21 | | | | 10 | 10 |
| 89 | 54 | 10 | 6 | 7 | 3 | 8 | 3 | 14 | | | 3 | 3 | 6 |
| 90 | 64 | 3 | 7.5 | 1 | 14 | | | 14 | 10 | | | | 10 |
| 91 | 68.5 | 10 | 3 | 0.3 | 6.2 | | | 6.2 | 10 | | | | 10 |
| 92 | 50 | 5 | 3 | 3 | 3 | 9 | 3 | 15 | 3 | 3 | 4 | 4 | 14 |

| Ex. No. | $TiO_2$ | $SiO_2$ | $ZrO_2$ | Total ($TiO_2+SiO_2+ZrO_2$) | Appearance | Acid Res. | Alkali Res. |
|---|---|---|---|---|---|---|---|
| 77 | 10 | | | 10 | ◯ | AA | ◯ |
| 78 | | 8 | | 8 | ◯ | AA | ◯ |
| 79 | | | 9 | 9 | ◯ | AA | ◯ |
| 80 | 0.5 | 0.5 | | 1 | ◯ | AA | ◯ |
| 81 | | 3 | 1 | 4 | ◯ | AA | ◯ |
| 82 | 3 | | 2 | 5 | ◯ | AA | ◯ |
| 83 | 2 | 1 | 1 | 4 | ◯ | AA | ◯ |
| 84 | 2 | 1 | 1 | 4 | ◯ | AA | ◯ |
| 85 | 0.5 | | | 0.5 | X | C | ◯ |
| 86 | | 3 | | 3 | X | C | ◯ |
| 87 | | | 3 | 3 | ◯ | B | ◯ |
| 88 | 11 | | | 11 | X | C | ◯ |
| 89 | 1 | 1 | 1 | 3 | ◯ | B | ◯ |
| 90 | 0.5 | | | 0.5 | ◯ | B | ◯ |
| 91 | 2 | | | 2 | X | B | ◯ |
| 92 | 3 | 2 | 5 | 10 | ◯ | B | ◯ |

EXAMPLES 93 to 113

Frits prepared by the same method used in Example 77 were finely pulverized in a pot mill to give frits for enameling having compositions shown in Table 9. Characteristics of the resulting frits for enameling are also summarized in Table 9.

The frits for enameling prepared in these Examples were immersed in an alkali solution and the rate of weight reduction thereof was found to be not more than 1%. More specifically, this clearly indicates that the frits for enameling prepared in these Examples never exhibit any reduction of their glossiness in the alkali resistance test.

Incidentally, the target softening point is not more than 480° C. as has been described above and the target rate of weight reduction in the chemical resistance (acid resistance, alkali resistance) is not more than 2%.

It is clear that all of the frits of these Examples achieve these target values and that the frits permit the production of enameled articles which can ensure the desired characteristics of enamels even at a low burning temperature on the order of 520° C. In particular, some of the enameled articles have a softening point of not more than 480° C. and the rate of weight reduction of pellets observed before and after the immersion in the acidic solution of not more than 1%, in certain Examples.

eling having compositions shown in Table 10. Characteristics of the resulting frits for enameling are also summarized in Table 10.

Then the frits for enameling according to these Examples were glazed onto a Zn—Al alloy (aluminum content: 55%)-plated steel sheet and then characteristic properties of the resulting enamel layers were evaluated. In this respect, the enamel used herein was a slip prepared by adding, to 100 parts by weight of the frits for enameling thus obtained and 20 parts by weight of rutile titanium oxide as a titanium pigment as a principal ingredient, one part by weight of a dispersant (sodium pyrophosphate) and 35 parts by weight of water and then pulverizing the resulting mixture in a ball mill.

Subsequently, each slip was glazed onto the surface of the foregoing Zn—Al alloy-plated steel sheet, followed by burning at 480 to 520° C. to give each corresponding enamel layer having a thickness ranging from 30 to 40 $\mu$m. Characteristic properties of the resulting enameled alloy-plated

TABLE 9

Compositions of Frits for Enameling and Quality of Enameled ARticles

| | | | | | Composition of frits for enameling (wt %) | | | | | | | | | | | | | Quality of enameled article | | |
|---|---|---|---|---|---|---|---|---|---|---|---|---|---|---|---|---|---|---|---|---|
| | | | | | | $Na_2O + K_2O + Li_2O$ | | | | | $ZnO + BaO + CaO$ | | | | $TiO_2 + SiO_2 + ZrO_2$ | | | Softening temperature | Acid Res. | Alkali-Res. |
| Ex. | $P_2O_5$ | $Sb_2O_3$ | $Al_2O_3$ | $B_2O_3$ | $Na_2O$ | $K_2O$ | $Li_2O$ | Total | ZnO | BaO | CaO | Total | $TiO_2$ | $SiO_2$ | $ZrO_2$ | Total | (° C.) | (%) | (%) |
| 93 | 50.0 | 11.0 | 8.0 | 0.5 | 11.5 | | | 11.5 | 14.0 | | | 14.0 | 5.0 | | | 5.0 | 480 | 1.2 | $\leq$1 |
| 94 | 50.0 | 10.0 | 3.0 | 4.0 | | 12.0 | | 12.0 | | 13.0 | | 13.0 | | 8.0 | | 8.0 | 480 | 1.3 | $\leq$1 |
| 95 | 51.0 | 10.0 | 8.0 | 0.5 | | | 11.5 | 11.5 | | | 11.0 | 11.0 | | | 8.0 | 8.0 | 480 | 1.2 | $\leq$1 |
| 96 | 51.5 | 12.0 | 8.0 | 0.5 | 9.0 | 4.0 | | 13.0 | 8.0 | 6.0 | | 14.0 | 0.75 | 0.25 | | 1.0 | 480 | 1.2 | $\leq$1 |
| 97 | 52.0 | 12.0 | 3.0 | 4.0 | | 1.0 | 11.0 | 12.0 | | 10.0 | 1.0 | 11.0 | | 5.0 | 1.0 | 6.0 | 479 | 1.2 | $\leq$1 |
| 98 | 52.5 | 7.0 | 8.0 | 2.0 | 7.5 | | 4.0 | 11.5 | 10.0 | | 1.0 | 11.0 | 6.0 | | 2.0 | 8.0 | 479 | 1.1 | $\leq$1 |
| 99 | 52.5 | 7.0 | 8.0 | 2.0 | 5.5 | 1.0 | 5.0 | 11.5 | 6.0 | 4.0 | 2.0 | 12.0 | 5.0 | 1.0 | 1.0 | 7.0 | 479 | 1.1 | $\leq$1 |
| 100 | 53.0 | 7.0 | 8.0 | 4.0 | 6.0 | 2.0 | 5.0 | 13.0 | 6.0 | 5.0 | 3.0 | 14.0 | 0.5 | 0.25 | 0.25 | 1.0 | 478 | 1.5 | $\leq$1 |
| 101 | 54.5 | 7.0 | 3.0 | 0.5 | 13.0 | | | 13.0 | | | 14.0 | 14.0 | | 8.0 | | 8.0 | 478 | 1.6 | $\leq$1 |
| 102 | 54.5 | 12.0 | 3.0 | 4.0 | | 11.5 | | 11.5 | 14.0 | | | 14.0 | 1.0 | | | 1.0 | 478 | 1.9 | $\leq$1 |
| 103 | 54.5 | 12.0 | 8.0 | 0.5 | | 13.0 | | 13.0 | | 11.0 | | 11.0 | | | 1.0 | 1.0 | 478 | 1.9 | $\leq$1 |
| 104 | 55.5 | 8.0 | 6.0 | 0.5 | 13.0 | | | 13.0 | 14.0 | | | 14.0 | 3.0 | | | 3.0 | 477 | 0.9 | $\leq$1 |
| 105 | 55.5 | 8.0 | 6.0 | 0.5 | | 13.0 | | 13.0 | | 11.0 | | 11.0 | | 6.0 | | 6.0 | 477 | 0.8 | $\leq$1 |
| 106 | 56.0 | 7.0 | 8.0 | 4.0 | 13.0 | | | 13.0 | 11.0 | | | 11.0 | 1.0 | | | 1.0 | 477 | 1.6 | $\leq$1 |
| 107 | 57.0 | 9.5 | 6.0 | 2.0 | | | 11.5 | 11.5 | | 11.0 | | 11.0 | | | 3.0 | 3.0 | 476 | 0.6 | $\leq$1 |
| 108 | 57.5 | 7.0 | 3.0 | 0.5 | | 3.0 | 10.0 | 13.0 | | 10.0 | 1.0 | 11.0 | | 7.0 | 1.0 | 8.0 | 476 | 1.6 | $\leq$1 |
| 109 | 57.5 | 12.0 | 3.0 | 4.0 | 11.5 | | | 11.5 | 11.0 | | | 11.0 | 1.0 | | | 1.0 | 476 | 1.9 | $\leq$1 |
| 110 | 58.0 | 9.5 | 4.0 | 0.5 | 11.0 | 2.0 | | 13.0 | 9.0 | 2.0 | | 11.0 | 3.0 | 1.0 | | 4.0 | 475 | 0.6 | $\leq$1 |
| 111 | 62.0 | 8.0 | 4.0 | 0.5 | 6.0 | 1.0 | 4.5 | 11.5 | 6.0 | 3.0 | 2.0 | 11.0 | 1.5 | 1.0 | 0.5 | 3.0 | 472 | 0.5 | $\leq$1 |
| 112 | 63.0 | 7.0 | 3.0 | 0.5 | | 11.5 | | 11.5 | | 14.0 | | 14.0 | | 1.0 | | 1.0 | 471 | 1.5 | $\leq$1 |
| 113 | 65.0 | 7.0 | 4.0 | 0.5 | | | 11.5 | 11.5 | | 11.0 | | 11.0 | | | 1.0 | 1.0 | 470 | 1.5 | $\leq$1 |

EXAMPLES 114 to 133

Frits prepared by the same method used in Example 77 were finely pulverized in a pot mill to give frits for enamsteel sheets were evaluated and as a result, it was found that these sheets had characteristic properties at least equal to or superior to those observed for the usual enameled alloy-plated steel sheets.

TABLE 10

Compositions of Frits for Enameling and Quality of Enameled Articles

Composition of frits for enameling (wt %)

| Ex. No. | $P_2O_5$ | $Sb_2O_3$ | $Al_2O_3$ | $B_2O_3$ | $Na_2O$ | $K_2O$ | $Li_2O$ | Total | ZnO | BaO | CaO | Total |
|---|---|---|---|---|---|---|---|---|---|---|---|---|
| | | | | | \multicolumn{4}{c}{$Na_2O + K_2O + Li_2O$} | \multicolumn{4}{c}{$ZnO + BaO + CaO$} |
| 114 | 49.0 | 12.0 | 3.0 | 4.0 | | 13.0 | | 13.0 | | 11.0 | | 11.0 |
| 115 | 50.5 | 7.0 | 9.0 | 0.5 | 13.0 | | | 13.0 | 11.0 | | | 11.0 |
| 116 | 51.0 | 8.0 | 9.0 | 0.5 | 11.5 | | | 11.5 | 11.0 | | | 11.0 |
| 117 | 51.5 | 7.0 | 9.0 | 0.5 | 4.0 | | 9.0 | 13.0 | 4.0 | | 7.0 | 11.0 |
| 118 | 51.5 | 13.0 | 4.0 | 0.5 | 6.0 | 8.0 | | 14.0 | 7.0 | 7.0 | | 14.0 |
| 119 | 51.5 | 13.0 | 4.0 | 0.5 | 6.0 | 7.0 | | 13.0 | 7.0 | 6.0 | | 15.0 |
| 120 | 51.5 | 12.0 | 4.0 | 0.5 | 5.0 | 9.0 | | 14.0 | 6.0 | 9.0 | | 15.0 |
| 121 | 52.0 | 8.0 | 8.0 | 0.5 | | | 11.5 | 11.5 | | | 11.0 | 11.0 |
| 122 | 52.7 | 12.0 | 4.0 | 0.3 | | | 13.0 | 13.0 | | 15.0 | | 15.0 |
| 123 | 52.7 | 13.0 | 4.0 | 0.3 | | | 13.0 | 13.0 | | | 14.0 | 14.0 |
| 124 | 54.0 | 7.0 | 6.0 | 5.0 | 3.0 | 6.0 | 2.0 | 11.0 | 1.0 | 4.0 | 6.0 | 11.0 |
| 125 | 54.0 | 6.5 | 6.0 | 5.0 | | 11.5 | | 11.5 | | 11.0 | | 11.0 |
| 126 | 54.5 | 7.0 | 6.0 | 5.0 | 11.5 | | | 11.5 | 10.0 | | | 10.0 |
| 127 | 55.5 | 6.5 | 6.0 | 4.0 | 11.0 | | | 11.0 | 11.0 | | | 11.0 |
| 126 | 56.0 | 7.0 | 6.0 | 4.0 | 11.0 | | | 11.0 | 10.0 | | | 10.0 |
| 129 | 60.0 | 8.0 | 2.0 | 2.0 | | 13.0 | | 13.0 | | 14.0 | | 14.0 |
| 130 | 62.5 | 7.0 | 2.0 | 4.0 | | 13.0 | | 13.0 | | 11.0 | | 11.0 |
| 131 | 63.0 | 7.0 | 2.0 | 0.5 | | 13.0 | | 13.0 | | 14.0 | | 14.0 |
| 132 | 64.0 | 8.0 | 3.0 | 2.0 | 2.0 | 7.5 | 2.0 | 11.5 | 1.0 | 3.0 | 7.0 | 11.0 |
| 133 | 66.0 | 7.0 | 3.0 | 0.5 | | | 11.5 | 11.5 | | | 11.0 | 11.0 |

| Ex. No. | \multicolumn{4}{c}{Composition of frits for enameling (wt %) $TiO_2 + SiO_2 + ZrO_2$} | Softening temperature (° C.) | Acid Res. (Rate of weight loss) (%) | Alkali Res. (rate of weight loss) (%) |
|---|---|---|---|---|---|---|---|
| | $TiO_2$ | $SiO_2$ | $ZrO_2$ | Total | | | |
| 114 | | 8.0 | | 8.0 | 510 | 2.5 | ≦1 |
| 115 | 9.0 | | | 9.0 | 505 | 1.0 | ≦1 |
| 116 | 9.0 | | | 9.0 | 505 | 1.0 | ≦1 |
| 117 | 1.0 | | 7.0 | 8.0 | 505 | 1.0 | ≦1 |
| 118 | 1.0 | 2.0 | | 3.0 | 485 | 4 0 | ≦1 |
| 119 | 1.0 | 2.0 | | 3.0 | 485 | 4.0 | ≦1 |
| 120 | 2.0 | 1.0 | | 3.0 | 485 | 3.5 | ≦1 |
| 121 | | | 9.0 | 9.0 | 505 | 1.0 | ≦1 |
| 122 | | | 3.0 | 3.0 | 485 | 3.0 | ≦1 |
| 123 | | | 3.0 | 3.0 | 485 | 4.0 | ≦1 |
| 124 | 1.0 | 2.0 | 3.0 | 6.0 | 505 | 2.0 | ≦1 |
| 125 | | 6.0 | | 6.0 | 505 | 1.0 | ≦1 |
| 126 | 6.0 | | | 6.0 | 505 | 2.0 | ≦1 |
| 127 | 6.0 | | | 6.0 | 505 | 1.0 | ≦1 |
| 126 | 6.0 | | | 6.0 | 500 | 1.5 | ≦1 |
| 129 | | 1.0 | | 1.0 | 478 | 2.5 | ≦1 |
| 130 | | 0.5 | | 0.5 | 477 | 3.0 | ≦1 |
| 131 | | 0.5 | | 0.5 | 477 | 3.0 | ≦1 |
| 132 | 0.1 | 0.2 | 0.2 | 0.5 | 477 | 3.5 | ≦1 |
| 133 | | 1.0 | | 1.0 | 470 | 1.0 | ≦1 |

Ex. 133: The slip underwent solidification during pulverization in a ball mill.

EXAMPLES 134 to 175

The same procedures used in Example 52 were repeated except for using ammonium hydrogen phosphate, aluminum oxide, antimony oxide, boric acid anhydride, sodium carbonate, potassium carbonate, lithium carbonate, zinc oxide, barium carbonate, calcium carbonate, titanium oxide, silicic acid anhydride and zirconium oxide as raw materials, to thus prepare frits for enameling listed in Tables 11 and 12.

The frits for enameling prepared in these Examples were found to have a rate of weight reduction, when immersed in an alkali aqueous solution, of not more than 1%. In other words, this indicated that the frits for enameling prepared in these Examples did not show any reduction of the glossiness, in the foregoing alkali resistance test. The results of the quality evaluation of the resulting frits for enameling are shown in Tables 11 and 12 along with the compositions of the frits.

It is clear that the frits of these Examples permit the production of enameled articles which can sufficiently satisfy the requirements for the target characteristics of enamels even at a low burning temperature on the order of 530° C. In particular, the enameled articles have a softening point of not more than 485° C. and the rate of weight reduction of pellets observed before and after the immersion in the acidic solution of not more than 0.4%, in certain Examples.

Then the frits for enameling according to these Examples were glazed onto a Zn—Al alloy (aluminum content: 55 wt %)-plated steel sheet and then characteristic properties of the resulting enamel layers were evaluated. In this respect, the enamel used herein was formed from a slip prepared by adding, to a blend of 100 parts by weight of the frits for enameling prepared in these Examples and having the compositions specified in Tables 11 and 12 and 20 parts by weight of rutile titanium oxide as a titanium pigment as a principal ingredient, one part by weight of a dispersant (sodium pyrophosphate) and 35 parts by weight of water and then pulverizing the resulting mixture in a ball mill.

Then each slip was glazed onto the surface of the foregoing 55 wt % Al—Zn alloy-plated steel sheet (Galbarium steel sheet), followed by burning at 490 to 530° C. to give each corresponding enamel layer having a thickness ranging from 30 to 40 μm. Characteristic properties of the resulting enameled alloy-plated steel sheets were evaluated and as a result, it was found that these sheets had characteristic properties at least equal to or superior to those observed for the usual enameled alloy-plated steel sheets.

More specifically, the frits of these Examples could be burnt at a low temperature and permitted the production of enameled articles excellent in chemical resistance.

TABLE 11

Compositions of Frits for Enameling and Quality of Enameled Articles

Composition of frits for enameling (wt %)

| Ex. No. | $P_2O_5$ | $Sb_2O_3$ | $Al_2O_3$ | $B_2O_3$ | $Na_2O + K_2O + Li_2O$ | | | | $ZnO + BaO + CaO$ | | | |
|---|---|---|---|---|---|---|---|---|---|---|---|---|
| | | | | | $Na_2O$ | $K_2O$ | $Li_2O$ | Total | ZnO | BaO | CaO | Total |
| 134 | 51.1 | 4.5 | 8.0 | 0.5 | 14.9 | | | 14.9 | 18.0 | | | 18.0 |
| 135 | 51.6 | 4.5 | 3.0 | 4.0 | | 14.9 | | 14.9 | | 18.0 | | 18.0 |
| 136 | 52.1 | 0.0 | 8.0 | 4.0 | | | 14.9 | 14.9 | | | 18.0 | 18.0 |
| 137 | 56.0 | 4.5 | 5.0 | 0.5 | 9.0 | | | 9.0 | 18.0 | | | 18.0 |
| 138 | 56.0 | 0.0 | 8.0 | 4.5 | | 9.0 | | 9.0 | | 18.0 | | 18.0 |
| 139 | 58.5 | 4 5 | 3.0 | 4.0 | | | 9.0 | 9.0 | | | 18.0 | 18.0 |
| 140 | 59.1 | 0.0 | 3.0 | 0 5 | 10.0 | 4.9 | | 14.9 | 12.0 | 6.0 | | 18.0 |
| 141 | 59.5 | 4.5 | 3.0 | 4.0 | | 4.0 | 5.0 | 9.0 | | 12.0 | 5.0 | 17.0 |
| 142 | 59.6 | 2.5 | 4.0 | 0.5 | 14.9 | | | 14.9 | 14.0 | | | 14.0 |
| 143 | 60.1 | 4.5 | 3.0 | 4.0 | 14.9 | | | 14.9 | 9.0 | | | 9.0 |
| 144 | 60.1 | 4.5 | 8.0 | 0 5 | | 14.9 | | 14.9 | | 9.0 | | 9.0 |
| 145 | 61.1 | 0.0 | 8.0 | 4 0 | | | 14.9 | 14.9 | | | 9.0 | 9.0 |
| 146 | 61 6 | 3.0 | 7.0 | 0.5 | 7.0 | | 7.9 | 14.9 | 6.0 | | 3.0 | 9.0 |
| 147 | 62.0 | 4.5 | 8.0 | 3.0 | 4.0 | 2.0 | 3.0 | 9.0 | 4.0 | 3.0 | 2.0 | 9.0 |
| 148 | 63.0 | 2.5 | 4.0 | 0.5 | | 13.0 | | 13.0 | | 14.0 | | 14.0 |
| 149 | 63.0 | 2.5 | 8.0 | 4.0 | 4.0 | | 5.0 | 9.0 | 5.0 | | 4.0 | 9.0 |
| 150 | 63.1 | 0.0 | 6.0 | 2.0 | | 14.9 | | 14.9 | 11.0 | | | 11.0 |
| 151 | 63.5 | 2.5 | 5.0 | 1.0 | | | 13.0 | 13.0 | | | 11.0 | 11.0 |
| 152 | 64.0 | 0.0 | 4.0 | 0.5 | 13.0 | | | 13.0 | | | 14.0 | 14.0 |
| 153 | 64.0 | 3.0 | 7.0 | 3.0 | 6.0 | | | 4.0 | 10.0 | | 4.0 | 10.0 |
| 154 | 64.0 | 2.5 | 3.0 | 0.5 | | 4.0 | 5.0 | 9.0 | | 10.0 | 8.0 | 18.0 |

| Ex. No. | Composition of frits for enameling (wt %) $TiO_2 + SiO_2 + ZrO_2$ | | | | Quality of enameled article | | |
|---|---|---|---|---|---|---|---|
| | $TiO_2$ | $SiO_2$ | $ZrO_2$ | Total | Softening temperature (° C.) | Acid Res. (Rate of weight loss) (%) | Alkali Res. (rate of weight loss) (%) |
| 134 | 3.0 | | | 3.0 | 490 | 1.0 | ≦1 |
| 135 | | 4.0 | | 4.0 | 490 | 0.9 | ≦1 |
| 136 | | | 3.0 | 3.0 | 480 | 0.5 | ≦1 |
| 137 | 4.00 | | | 4.0 | 467 | 1.0 | ≦1 |
| 138 | | 4.5 | | 4.5 | 487 | 0.4 | ≦1 |
| 139 | | | 3.0 | 3.0 | 486 | 1.0 | ≦1 |
| 140 | 3.0 | 1.5 | | 4.5 | 486 | 0.5 | ≦1 |
| 141 | | 2.00 | 1.00 | 3.0 | 485 | 0.9 | ≦1 |
| 142 | 4.5 | | | 4.5 | 475 | 0.4 | ≦1 |
| 143 | 4.5 | | | 4.5 | 485 | 0.8 | ≦1 |
| 144 | | 3.0 | | 3.0 | 485 | 1.0 | ≦1 |
| 145 | | 3.0 | | 3.0 | 483 | 0.5 | ≦1 |
| 146 | 3.0 | | 1.0 | 4.0 | 483 | 0.8 | ≦1 |
| 147 | 2.0 | 1.5 | 1.0 | 4.5 | 484 | 1.0 | ≦1 |
| 148 | | 3.0 | | 3.0 | 470 | 0.3 | ≦1 |
| 149 | 3.0 | | 1.5 | 4.5 | 484 | 0.8 | ≦1 |
| 150 | | 3.0 | | 3.0 | 485 | 0.2 | ≦1 |
| 151 | | 4.0 | | 4.0 | 470 | 0.2 | ≦1 |
| 152 | | 4.5 | | 4.5 | 485 | 0.1 | ≦1 |
| 153 | 2.0 | | 1.0 | 3.0 | 485 | 0.9 | ≦1 |
| 154 | | 2.0 | 1.0 | 3.0 | 485 | 0.8 | ≦1 |

TABLE 12

Compositions of Frits for Enameling and Quality of Enameled Articles

| Ex. No. | Composition of frits for enameling (wt %) | | | | | | | | | | | |
|---|---|---|---|---|---|---|---|---|---|---|---|---|
| | | | | | | Na$_2$O + K$_2$O + Li$_2$O | | | ZnO + BaO + CaO | | | |
| | P$_2$O$_5$ | Sb$_2$O$_3$ | Al$_2$O$_3$ | B$_2$O$_3$ | Na$_2$O | K$_2$O | Li$_2$O | Total | ZnO | BaO | CaO | Total |
| 155 | 49.0 | 4.0 | 8.0 | 4.0 | 14.0 | | | 14.0 | 17.0 | | | 17.0 |
| 156 | 50.0 | 1.0 | 7.0 | 5.0 | | 15.0 | | 15.0 | | 19.0 | | 19.0 |
| 157 | 50.5 | 5.5 | 3.0 | 5.0 | | | 12.5 | 12.5 | | | 19.0 | 19.0 |
| 158 | 50.5 | 1.0 | 8.0 | 5.0 | 14.5 | | | 14.5 | 19.0 | | | 19.0 |
| 159 | 52.0 | 5.5 | 3.0 | 5.0 | | 14.5 | | 14.5 | | 18.0 | | 18.0 |
| 160 | 53.2 | 3.0 | 9.0 | 0.3 | | | 12.5 | 12.5 | | | 17.0 | 17.0 |
| 161 | 55.5 | 5.5 | 2.0 | 4.0 | 3.0 | 7.0 | | 10.0 | 8.0 | 11.0 | | 19.0 |
| 162 | 57.5 | 2.0 | 2.0 | 3.0 | | 10.0 | 4.5 | 14.5 | | 8.0 | 11.0 | 19.0 |
| 163 | 58.0 | 3.0 | 3.0 | 4.0 | 15.0 | | | 15.0 | 15.0 | | | 15.0 |
| 164 | 58.2 | 4.0 | 8.0 | 0.3 | 8.0 | | | 8.0 | 17.0 | | | 17.0 |
| 165 | 58.5 | 4.0 | 8.0 | 0.5 | | 9.0 | | 9.0 | | 15.0 | | 15.0 |
| 166 | 59.2 | 4.5 | 8.0 | 0.3 | | | 8.0 | 8.0 | | | 15.0 | 15.0 |
| 167 | 59.5 | 5.5 | 4.0 | 4.0 | 8.0 | | 7.0 | 15.0 | 3.0 | | 7.0 | 10.0 |
| 168 | 60.5 | 4.5 | 9.0 | 0.5 | 3.5 | 6.0 | 3.0 | 12.5 | 1.0 | 1.0 | 6.0 | 8.0 |
| 169 | 61.5 | 5.5 | 2.0 | 3.0 | | 15.0 | | 15.0 | | 10.0 | | 10.0 |
| 170 | 62.2 | 4.5 | 8.0 | 0.3 | 6.5 | | 6.0 | 12.5 | 3.0 | | 5.0 | 8.0 |
| 171 | 64.0 | 4.5 | 9.0 | 2.0 | | 8.0 | | 8.0 | 8.0 | | | 8.0 |
| 172 | 64.0 | 4.5 | 9.0 | 0.5 | | 9.0 | | 9.0 | | | 8.0 | 8.0 |
| 173 | 64.0 | 4.5 | 8.0 | 0.5 | 8.0 | | | 8.0 | | | 10.0 | 10.0 |
| 174 | 64.7 | 4.5 | 9.0 | 0.3 | 4.0 | | 4.0 | 8.0 | 3.0 | | 6.0 | 9.0 |
| 175 | 66.0 | 0.0 | 3.0 | 1.0 | | 8.0 | 4.0 | 12.0 | | 5.0 | 10.0 | 15.0 |

| Ex. | Composition of frits for enameling (wt %) TiO$_2$ + SiO$_2$ + ZrO$_2$ | | | | Quality of enameled article | | |
|---|---|---|---|---|---|---|---|
| | TiO$_2$ | SiO$_2$ | ZrO$_2$ | Total | Softening temperature (° C.) | Acid Res. (Rate of weight loss) (%) | Alkali Res. (rate of weight loss) (%) |
| 155 | 4.0 | | | 4.0 | 500 | 2.5 | ≦1 |
| 156 | | 3.0 | | 3.0 | 490 | 3.0 | ≦1 |
| 157 | | | 4.5 | 4.5 | 480 | 4.0 | ≦1 |
| 158 | 2.0 | | | 2.0 | 485 | 2.0 | ≦1 |
| 159 | | 2.0 | | 2.0 | 480 | 4.0 | ≦1 |
| 160 | | | 5.0 | 5.0 | 500 | 0.9 | ≦1 |
| 161 | 1.0 | 3.0 | | 4.0 | 480 | 5.0 | ≦1 |
| 162 | | 0.5 | 1.5 | 2.0 | 488 | 1.5 | ≦1 |
| 163 | 2.0 | | | 2.0 | 485 | 1.5 | ≦1 |
| 164 | 4.5 | | | 4.5 | 510 | 0.8 | ≦1 |
| 165 | | 5.0 | | 5.0 | 505 | 0.6 | ≦1 |
| 166 | | | 5.0 | 5.0 | 510 | 0.7 | ≦1 |
| 167 | 1.0 | | 1.0 | 2.0 | 480 | 5.0 | ≦1 |
| 168 | 1.0 | 1.0 | 3.0 | 5.0 | 515 | 0.7 | ≦1 |
| 169 | | 3.0 | | 3.0 | 480 | 5.0 | ≦1 |
| 170 | 1.5 | | 3.0 | 4.5 | 515 | 0.8 | ≦1 |
| 171 | | 4.5 | | 4.5 | 520 | 0.8 | ≦1 |
| 172 | | 5.0 | | 5.0 | 520 | 0.7 | ≦1 |
| 173 | | 5.0 | | 5.0 | 515 | 0.7 | ≦1 |
| 174 | 1.5 | | 3.0 | 4.5 | 520 | 0.8 | ≦1 |
| 175 | | 1.0 | 2.0 | 3.0 | 480 | 0.1 | ≦1 |

Ex. 175: The slip underwent solidification during pulverization in a ball mill.

As has been discussed above in detail, the present invention permits the production of an enameled steel sheet excellent in both corrosion resistance and enamel-adhesiveness which has not been able to be realized by any conventional techniques, at low facility investment and low cost and can provide an enameled material for post-bending. This is not only industrially quite advantageous, but also contributes to the improvement of interior materials in hygienic properties. Moreover, the enameled material of the present invention is excellent in enamel-adhesiveness and end face corrosion resistance and therefore, if the present invention is applied to enameled articles which are not subjected to post-bending, the resulting enameled article has a long life time which has not been attained by any conventional enameled steel sheets. This accordingly leads to the improvement of the durability of enameled articles and consequently, the present invention would contribute to the substantial saving of natural resources.

In addition, the frits for enameling according to the present invention can be subjected to low temperature burning, can be applied even to plated steel sheets. Further the enameled articles obtained using the frits are excellent in chemical durability, in particular, acid resistance, and in surface properties and free of any harmful substance such as Pb. Thus, the frits for enameling show excellent quality which makes it favorable to use them in a variety of enameled articles.

What is claimed is:

1. A porcelain enameled steel sheet comprising:
   an interstitial layer formed on a surface of an aluminum-zinc alloy-plated steel sheet; and an enamel coating layer formed on the interstitial layer.

2. The porcelain enameled steel sheet of claim 1 wherein the interstitial layer formed is one selected from the group consisting of:
   (1) a coating layer comprising at least one member selected from the group consisting of Ni, Co, Mo, Mn, Al, Al—Zn, Al—Ni, Al—Ni—Zn, Ni—P, Ni—Co—P and Co—P;
   (2) a chromate layer; and
   (3) a coating layer comprising at least one member selected from the group consisting of zinc phosphate, manganese phosphate and aluminum phosphate.

3. The porcelain enameled steel sheet of claim 1 interstial layer formed is one selected from the group consisting of:
   (1) Al and Al—Zn, whose aluminum content is not less than 96% by weight; and
   (2) Al—Zn—N, whose Zn content is not more than 1% by weight.

4. Frits for enameling comprising $P_2O_5$, $Sb_2O_3$, $Al_2O_3$ and $B_2O_3$; at least one oxide of Group I element of Periodic Table selected from the group consisting of $Na_2O$, $K_2O$ and $Li_2O$; at least one oxide of Group II metal of Periodic Table selected from the group consisting of ZnO, BaO, CaO and SrO; and at least one oxide of Group IV element of Periodic Table selected from the group consisting of $TiO_2$, $SiO_2$ and $ZrO_2$; containing one of the following relations of (1), (2) or (3):
   (1) 45 wt %$\leq P_2O_5 \leq$65 wt %, 5 wt %$\leq Sb_2O_3 \leq$15 wt %, 2 wt %$\leq Al_2O_3 \leq$10 wt %, 0.5 wt %$\leq B_2O_3 \leq$5 wt %, 7 wt %$\leq Na_2O+K_2O+Li_2O<$15 wt %, 7 wt %$\leq$ZnO+BaO+CaO+SrO$\leq$20 wt %, 1 wt %$\leq TiO_2+SiO_2+ZrO_2 \leq$10 wt %,
   (2) 50 wt %$\leq P_2O_5 \leq$65 wt %, 7 wt %$\leq Sb_2O_3 \leq$12 wt %, 3 wt %$\leq Al_2O_3 \leq$8 wt %, 0.5 wt %$\leq B_2O_3 \leq$4 wt %, 11.5 wt %$\leq Na_2O+K_2O+Li_2O \leq$13 wt %, 11 wt %$\leq$ZnO+BaO+CaO$\leq$14 wt %, 1 wt %$\leq TiO_2+SiO_2+ZrO_2 \leq$8 wt %,
   (3) 50 wt %$\leq P_2O_5 \leq$65 wt %, 0 wt %$<Sb_2O_3<$5 wt %, 3 wt %$\leq Al_2O_3 \leq$8 wt %, 0.5 wt %$\leq B_2O_3 \leq$4.6 wt %, 9 wt %$\leq Na_2O_3+K_2O+Li_2O<$15 wt %, 9 wt %$\leq$ZnO+BaO+CaO$\leq$18 wt %, 3 wt %$\leq TiO_2+SiO_2+ZrO_2 \leq$4.5 wt %.

5. A porcelain enameled steel sheet which comprises an aluminum-zinc alloy-plated steel sheet and a porcelain enamel coating layer as an upper most layer of the steel sheet, wherein an interstitial layer between the plating layer and the enamel coating layer comprises at least one member selected from the group consisting of:
   (1) a coating layer comprising at least one member selected from the group consisting of Ni, Co, Mo, Mn, Al, Al—Zn, Al—Ni, Al—Ni—Zn, Ni—P, Ni—Co—P and Co—P;
   (2) a chromate layer; and
   (3) a coating layer comprising at least one member selected from the group consisting of zinc phosphate, manganese phosphate and aluminum phosphate.

6. The porcelain enameled steel sheet of claim 5 wherein the thickness of the enamel coating layer is less than 50 $\mu$m.

7. The enameled steel sheet of claim 5 wherein the enamel coating layer is formed by burning at a temperature of not more than 540° C.

8. The porcelain enameled steel sheet of claim 5 wherein it is processed after burning the enamel coating layer.

9. The porcelain enameled steel sheet of claim 5, wherein said interstitial layer comprises at least one member selected from the group consisting of Al and Al—Zn, whose Al content is not less than 96% by weight.

10. The porcelain enameled steel sheet of claim 5, wherein said interstitial layer comprises Al—Zn—Ni, whose Zn content is not more than 1% by weight.

11. The porcelain enameled steel sheet of claim 10 wherein the upper portion, which is the surface layer on the said aluminum-zinc alloy-plating layer is formed by immersing the said steel sheet in a nickel-containing aqueous solution having a pH of not more than 4 and contains aluminum, nickel and not more than 1% by weight of zinc.

12. The porcelain enameled steel sheet of claim 5, wherein the enamel coating layer comprises $P_2O_5$, $Sb_2O_3$, $Al_2O_3$ and $B_2O_3$; at least one oxide of Group I metal of Periodic Table selected from the group consisting of $Na_2O$, $K_2O$ and $Li_2O$; at least one oxide of Group II metal of Periodic Table selected from the group consisting of ZnO, BaO, CaO and SrO; and at least one oxide of Group IV element of Periodic Table selected from the group consisting of $TiO_2$, $SiO_2$ and $ZrO_2$; containing at least one of the following relations of (1), (2), (3) or (4):
   (1) 45 wt %$\leq P_2O_5 \leq$65 wt %, 5 wt %$\leq Sb_2O_3 \leq$15 wt %, 2 wt %$\leq Al_2O_3 \leq$10 wt %, 0.5 wt %$\leq B_2O_3 \leq$5 wt %, 7 wt %$\leq Na_2O+K_2O+Li_2O<$15 wt %, 7 wt %$\leq$ZnO+BaO+CaO+SrO$\leq$20 wt %, 1 wt %$\leq$TiO+SiO+$ZrO_2 \leq$10 wt %,
   (2) 50 wt %$\leq P_2O_5 \leq$65 wt %, 7 wt %$\leq Sb_2O_3 \leq$12 wt %, 3 wt %$\leq Al_2O_3 \leq$8 wt %, 0.5 wt %$\leq B_2O_3 \leq$4 wt %, 11.5 wt %$\leq Na_2O+K_2O+Li_2O \leq$13 wt %, 11 wt %$\leq$ZnO+BaO+CaO$\leq$14 wt %, 1 wt %$\leq TiO_2+SiO_2+ZrO_2 \leq$8 wt %,
   (3) 50 wt %$\leq P_2O_5 \leq$65 wt %, 0 wt %$<Sb_2O_3<$5 wt %, 3 wt %$\leq Al_2O_3 \leq$8 wt %, 0.5 wt %$\leq B_2O_3 \leq$4.6 wt %, 9 wt %$\leq Na_2O_3+K_2O+Li_2O<$15 wt %, 9 wt %$\leq$ZnO+BaO+CaO$\leq$18 wt %, 3 wt %$\leq TiO_2+SiO_2+ZrO_2 \leq$4.5 wt %,
   (4) 45 wt %$\leq P_2O_5 \leq$65 wt %, 5 wt %$\leq Sb_2O_3 \leq$15 wt %, 2 wt %$\leq Al_2O_3 \leq$10 wt %, 1 wt %$\leq B_2O_3 \leq$5 wt %, 7 wt %$\leq Na_2O+K_2O+Li_2O<$20 wt %, 7 wt %$\leq$ZnO+BaO+CaO+SrO$\leq$20 wt %, 3 wt %$\leq TiO_2+SiO_2+ZrO_2 \leq$10 wt %.

13. The porcelain enameled steel sheet of claim 5, wherein the enamel coating layer comprises $P_2O_5$, $Al_2O_3$ and $B_2O_3$; at least one oxide of Group I metal of Periodic Table selected from the group consisting of $Na_2O$, $K_2O$ and $Li_2O$; at least one oxide of Group II metal of Periodic Table selected from the group consisting of ZnO, BaO, and CaO; and at least one oxide of Group IV element of Periodic Table selected from the group consisting of $TiO_2$, $SiO_2$ and $ZrO_2$; containing the following relations of:
   50 wt %$\leq P_2O_5 \leq$65 wt %, 3 wt %$\leq Al_2O_3 \leq$8 wt %, 0.5 wt %$\leq B_2O_3 \leq$4.6 wt %, 9 wt %$\leq Na_2O+K_2O+Li_2O<$15 wt %, 9 wt %$\leq$ZnO+BaO+CaO$\leq$18 wt %, 3 wt %$\leq TiO_2+SiO_2+ZrO_2 \leq$4.5 wt %.

14. The porcelain enameled steel sheet of claim 5, wherein said interstitial layer comprises Ni deposited substantially on the Zn surface of the Al—Zn alloy plating layer.

15. Frits for enameling comprising $P_2O_5$, $Al_2O_3$ and $B_2O_3$; at least one oxide of Group I element of Periodic Table selected from the group consisting of $Na_2O$, $K_2O$ and $Li_2O$; at least one oxide of Group II metal of Periodic Table selected from the group consisting of ZnO, BaO and CaO; and at least one oxide of Group IV element of Periodic Table selected from the group consisting of $TiO_2$, $SiO_2$ and $ZrO_2$; containing the following relations of:
   50 wt %$\leq P_2O_5 \leq$65 wt %, 3 wt %$\leq Al_2O_3 \leq$8 wt %, 0.5 wt %$\leq B_2O_3 \leq$4.6 wt %, 9 wt %$\leq Na_2O+K_2O+Li_2O<$15 wt %, 9 wt %$\leq$ZnO+BaO+CaO$\leq$18 wt %, 3 wt %$\leq TiO_2+SiO_2+ZrO_2 \leq$4.5 wt %.

* * * * *

UNITED STATES PATENT AND TRADEMARK OFFICE
CERTIFICATE OF CORRECTION

PATENT NO. : 5,993,974
DATED : November 30, 1999
INVENTOR(S) : Yasumasa FUKUSHIMA et al.

It is certified that error appears in the above-indentified patent and that said Letters Patent is hereby corrected as shown below:

Column 4, line 13, change "%" (second and fourth occurrences) to --%,--;

line 14, change "%" (second and fourth occurrences) to --%,--;

line 15, change "%" (second occurrence) to --%,--;

line 16, change "%" (first occurrence) to --%,--;

line 18, change "%" (second and fourth occurrences) to --%,--;

line 19, change "%" (second and fourth occurrences) to --%,--;

line 20, change "%" (second occurrence) to --%,--;

line 21, change "%" (first occurrence) to --%,--;

line 23, change "%" (second and fourth occurrences) to --%,--;

line 24, change "%" (second and fourth occurrences) to --%,--;

line 25, change "%" (second occurrence) to --%,--;

UNITED STATES PATENT AND TRADEMARK OFFICE
CERTIFICATE OF CORRECTION

PATENT NO. : 5,993,974
DATED : November 30, 1999
INVENTOR(S) : Yasumasa FUKUSHIMA et al.

It is certified that error appears in the above-indentified patent and that said Letters Patent is hereby corrected as shown below:

line 26, change "%" (first occurrence) to --%,--;

line 27, change "%" (second and fourth occurrences) to --%,--;

line 28, change "%" (second and fourth occurrences) to --%,--;

line 29, change "%" (second occurrence) to --%,--;

line 30, change "%" (first occurrence) to --%,--.

Column 5, line 8, change "%" (second and fourth occurrences) to --%,--;

line 9, change "%" (second and fourth occurrences) to --%,--;

line 10, change "%" (second occurrence) to --%,--;

line 11, change "%" (first occurrence) to --%,--;

line 13, change "%" (second and fourth occurrences) to --%,--;

UNITED STATES PATENT AND TRADEMARK OFFICE
CERTIFICATE OF CORRECTION

PATENT NO. : 5,993,974
DATED : November 30, 1999
INVENTOR(S) : Yasumasa FUKUSHIMA et al.

It is certified that error appears in the above-indentified patent and that said Letters Patent is hereby corrected as shown below:

line 14, change "%" (second and fourth occurrences) to --%,--;

line 15, change "%" (second occurrence) to --%,--;

line 16, change "%" (first occurrence) to --%,--;

line 18, change "%" (second and fourth occurrences) to --%,--;

line 19, change "%" (second and fourth occurrences) to --%,--;

line 20, change "%" (second occurrence) to --%,--;

line 21, change "%" (first occurrence) to --%,--.

Column 6, line 45, change "tis" to --the firm to be formed is--.

Column 16, line 3, change "Apearance:" to --Appearance:--.

Column 17, line 14, change "Steet" to --Steel--.

UNITED STATES PATENT AND TRADEMARK OFFICE
CERTIFICATE OF CORRECTION

PATENT NO. : 5,993,974
DATED : November 30, 1999
INVENTOR(S) : Yasumasa FUKUSHIMA et al.

It is certified that error appears in the above-indentified patent and that said Letters Patent is hereby corrected as shown below:

Column 19, line 3, change "Eameled" to --Enameled--;

line 9, change "(interstial" to --(interstitial--.

Column 20, line 7, change "protion" to --portion--.

Column 21, line 3, change "Eameled" to --Enameled--;

line 9, change "(interstial" to --(interstitial--.

Column 22, line 7, change "protion" to --portion--.

Column 36, line 30, change "ARticles" to --Articles--.

Column 43, line 13, after "1" insert --wherein the--;

line 18, change "Al-Zn-N," to --Al-Zn-Ni,--.

Column 44, line 23, change "%≤TiO+Sio+" to --%≤TiO$_2$+Sio$_2$+--.

Signed and Sealed this

Twenty-seventh Day of March, 2001

Attest:

NICHOLAS P. GODICI

*Attesting Officer*    *Acting Director of the United States Patent and Trademark Office*